US012759161B2

(12) United States Patent
Wada

(10) Patent No.: US 12,759,161 B2
(45) Date of Patent: Oct. 13, 2026

(54) DEVICE FOR ACQUIRING POSITION OF WORKPIECE, CONTROL DEVICE, ROBOT SYSTEM, AND METHOD

(71) Applicant: Fanuc Corporation, Minamitsuru-gun (JP)

(72) Inventor: Jun Wada, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/835,080

(22) PCT Filed: Feb. 15, 2022

(86) PCT No.: PCT/JP2022/005957
§ 371 (c)(1),
(2) Date: Aug. 1, 2024

(87) PCT Pub. No.: WO2023/157083
PCT Pub. Date: Aug. 24, 2023

(65) Prior Publication Data

US 2025/0153362 A1 May 15, 2025

(51) Int. Cl.
*B25J 9/16* (2006.01)

(52) U.S. Cl.
CPC .................................. *B25J 9/1697* (2013.01)

(58) Field of Classification Search
CPC ................. B25J 9/1697; B25J 9/1679; G05B 2219/40564; G05B 2219/45061
See application file for complete search history.

(56) References Cited

U.S. PATENT DOCUMENTS

2004/0019405 A1 1/2004 Ban et al.
2016/0283792 A1 9/2016 Okazaki
2018/0250823 A1* 9/2018 Shimodaira ............ B25J 9/1612
2018/0361595 A1 12/2018 Troy et al.
2020/0008874 A1 1/2020 Barbagli et al.
2020/0051331 A1* 2/2020 Oota ....................... G06T 17/10
2020/0151844 A1* 5/2020 Kitajima ............. G06V 10/761
(Continued)

FOREIGN PATENT DOCUMENTS

JP 2002046087 A 2/2002
JP 2004-050390 A 2/2004
(Continued)

OTHER PUBLICATIONS

Int'l Search Report (PCT/ISA/210) w/ translation & Written Opinion (PCT/ISA/237) mailed on May 10, 2022, by the Japanese Patent Office in Int'l App. No. PCT/JP2022/005957. (10 pages).

*Primary Examiner* — Nhi Q Bui
(74) *Attorney, Agent, or Firm* — BUCHANAN INGERSOLL & Rooney PC

(57) ABSTRACT

A device includes a model acquisition unit that acquires a workpiece model representing a modeled workpiece; a partial model generation unit that generates, using the workpiece model acquired by the model acquisition unit, a partial model representing a limited part of the workpiece model; and a position acquisition unit that matches the partial model generated by the partial model generation unit with shape data detected by a shape detection sensor to acquire the position, in a control coordinate system, of the portion of the workpiece corresponding to the partial model.

19 Claims, 31 Drawing Sheets

(56) References Cited

U.S. PATENT DOCUMENTS

| | | | | |
|---|---|---|---|---|
| 2021/0023718 | A1* | 1/2021 | Yoneyama | B25J 9/1671 |
| 2021/0056659 | A1* | 2/2021 | Ogura | G06V 20/52 |

FOREIGN PATENT DOCUMENTS

| | | | | |
|---|---|---|---|---|
| JP | 2006102877 | A | | 4/2006 |
| JP | 2016-179534 | A | | 10/2016 |
| JP | 2017102529 | A | | 6/2017 |
| JP | 2017182113 | A | | 10/2017 |
| JP | 2019051585 | A | | 4/2019 |
| JP | 2019089172 | A | * | 6/2019 |

* cited by examiner

DEVICE FOR ACQUIRING POSITION OF WORKPIECE, CONTROL DEVICE, ROBOT SYSTEM, AND METHOD

CROSS REFERENCE TO RELATED APPLICATIONS

This is the U.S. National Phase application of PCT/JP2022/005957, filed Feb. 15, 2022, the disclosure of this application being incorporated herein by reference in its entirety for all purposes.

FIELD OF THE INVENTION

The present disclosure relates to a device, a controller, a robot system, and a method of acquiring a position of a workpiece.

BACKGROUND OF THE INVENTION

A device is known that acquires a position of a workpiece, based on shape data (specifically, image data) of the workpiece detected by a shape detection sensor (specifically, vision sensor) (e.g., PTL 1).

PATENT LITERATURE

PTL 1: JP 2017-102529 A

SUMMARY OF THE INVENTION

For example, a workpiece may not fit in a detection range of a shape detection sensor when using a large workpiece. In such a case, a technique for acquiring the position of the workpiece is required.

In one aspect of the present disclosure, a device configured to acquire a position of a workpiece in a control coordinate system, based on shape data of the workpiece detected by a shape detection sensor arranged at a known position in the control coordinate system includes: a model acquiring unit configured to acquire a workpiece model modeling the workpiece; a partial model generating unit configured to generate a partial model obtained by limiting the workpiece model to a part thereof, using the workpiece model acquired by the model acquiring unit; and a position acquiring unit configured to acquire a first position in the control coordinate system of a portion of the workpiece corresponding to the partial model, by matching the partial model generated by the partial model generating unit with the shape data detected by the shape detection sensor.

In another aspect of the present disclosure, a method of acquiring a position of a workpiece in a control coordinate system, based on shape data of the workpiece detected by a shape detection sensor arranged at a known position in the control coordinate system, the method including: acquiring, by a processor, a workpiece model modeling the workpiece; generating, by the processor, a partial model obtained by limiting the workpiece model to a part thereof, using the acquired workpiece model; and acquiring, by the processor, a position in the control coordinate system of a portion of the workpiece corresponding to the partial model, by matching the partial model generated by the partial model generating unit with the shape data detected by the shape detection sensor.

According to the present disclosure, even when a workpiece does not fit in a detection range of a shape detection sensor, the position of a portion of the workpiece detected by the shape detection sensor can be acquired by executing matching using a partial model obtained by limiting the workpiece model to a part thereof. Therefore, even when the workpiece is relatively large or the like, the position of the workpiece in a control coordinate system can be accurately acquired, and as a result, a work on the workpiece can be carried out with high accuracy based on the acquired position.

DETAILED DESCRIPTION OF EMBODIMENTS OF THE INVENTION

Figure 1:
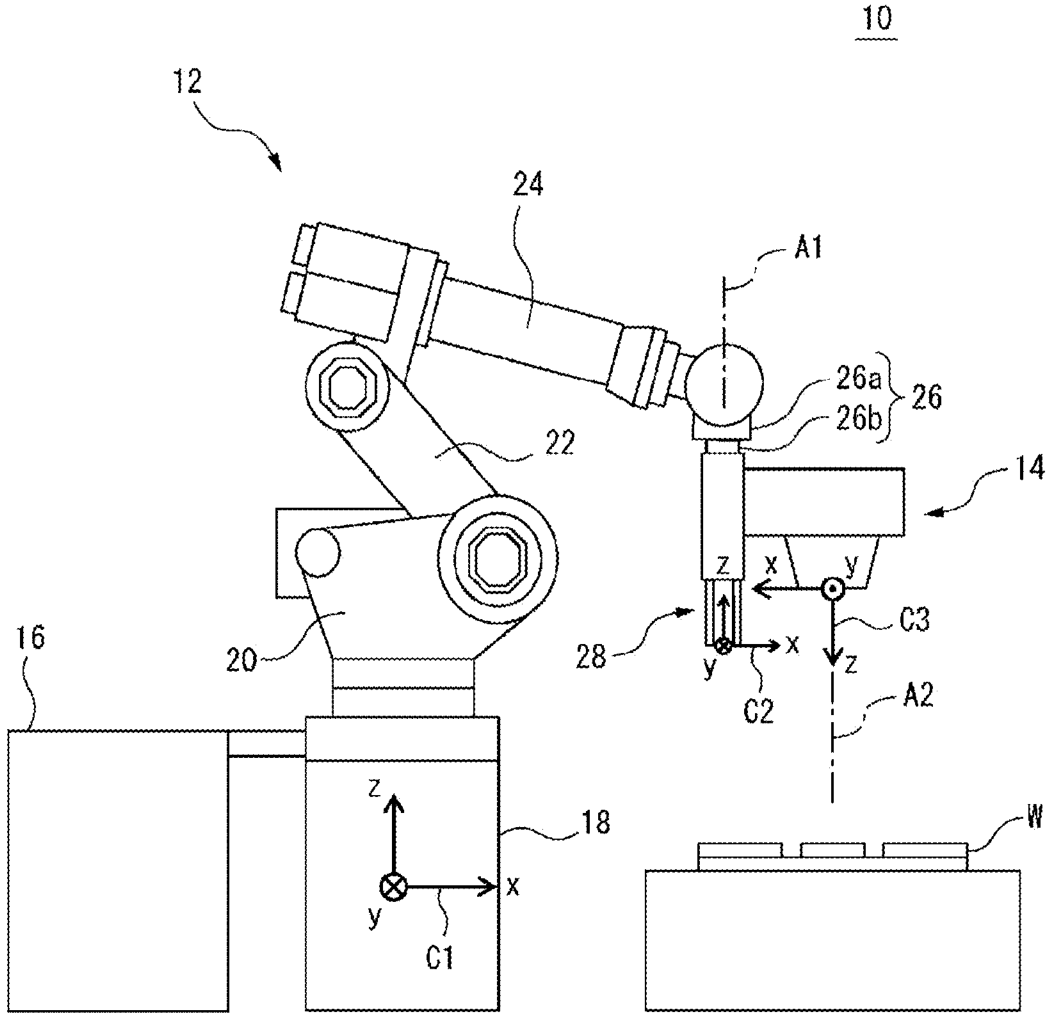
FIG. 1 is a schematic view of a robot system according to an embodiment.

Embodiments of the present disclosure are described in detail below with reference to the drawings. Note that in various embodiments described below, the same elements are denoted with the same reference numerals, and overlapping description is omitted. First, a robot system 10 according to an embodiment will be described with reference to FIGS. 1 and 2. The robot system 10 includes a robot 12, a shape detection sensor 14, and a controller 16.

In the present embodiment, the robot 12 is a vertical articulated robot and includes a robot base 18, a rotary barrel 20, a lower arm 22, an upper arm 24, a wrist 26, and an end effector 28. The robot base 18 is fixed on the floor of a work cell. The rotary barrel 20 is provided on the robot base 18 so as to be able to rotate about a vertical axis.

The lower arm 22 is provided on the rotary barrel 20 so as to be pivotable about a horizontal axis, and the upper arm 24 is pivotally provided at a distal end of the lower arm 22. The wrist 26 includes a wrist base 26*a* provided at a distal end of the upper arm 24 so as to be pivotable about two axes orthogonal to each other, and a wrist flange 26*b* provided on the wrist base 26*a* so as to be pivotable about a wrist axis A1.

The end effector 28 is removably attached to the wrist flange 26*b*. The end effector 28 is, for example, a robot hand capable of gripping a workpiece W, a welding torch for welding the workpiece W, a laser process head for subjecting the workpiece W to a laser process, or the like, and carries out a predetermined work (workpiece handling, welding, or laser process) on the workpiece W.

Figure 2:
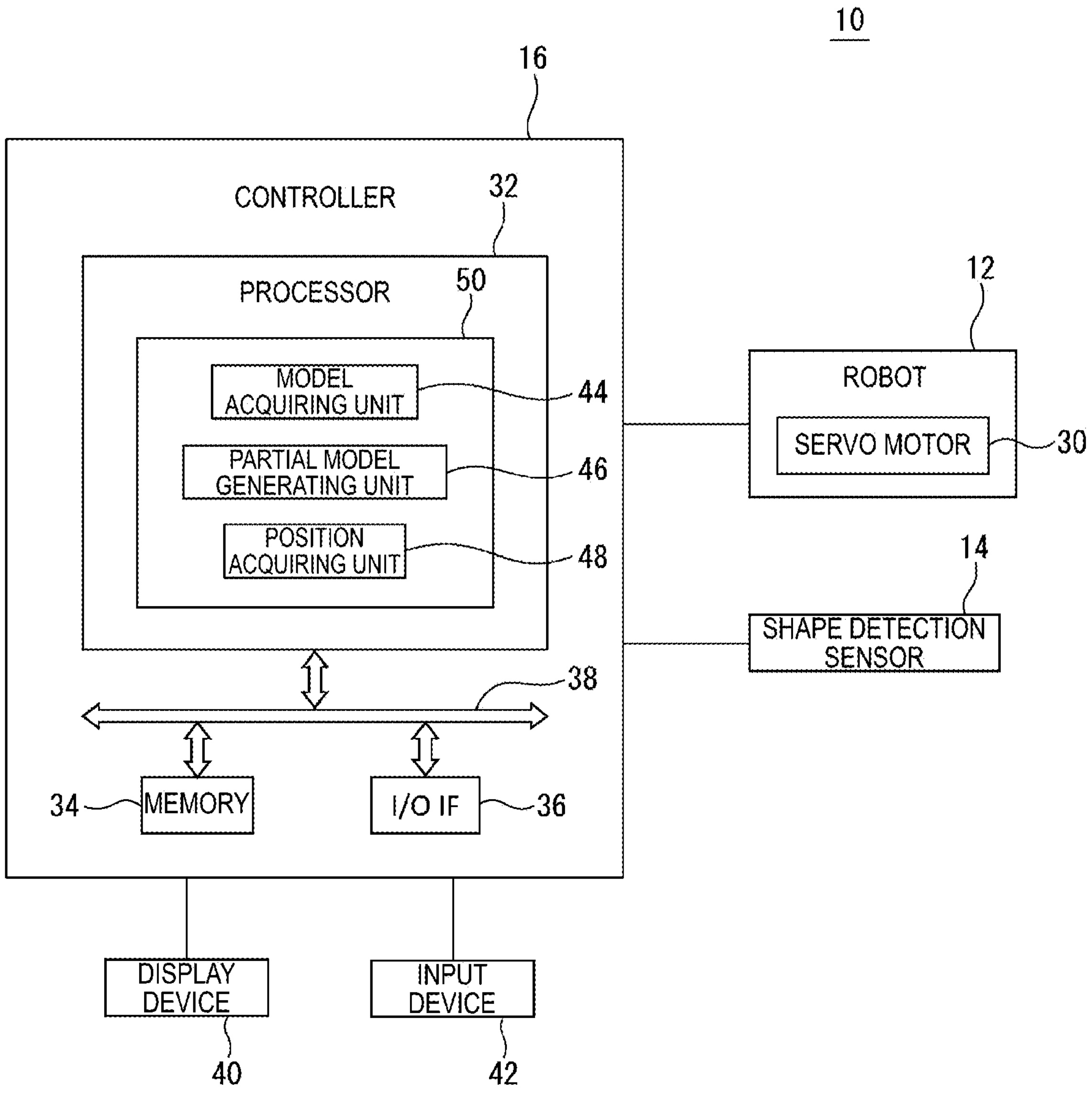
FIG. 2 is a block diagram of the robot system illustrated in FIG. 1.

Each constituent element (the robot base 18, the rotary barrel 20, the lower arm 22, the upper arm 24, and the wrist 26) of the robot 12 is provided with a servo motor 30 (FIG. 2). These servo motors 30 cause each movable element (the rotary barrel 20, the lower arm 22, the upper arm 24, the wrist 26, and the wrist flange 26*b*) of the robot 12 to pivot about a drive shaft in response to a command from the controller 16. As a result, the robot 12 can move the end effector 28 and arrange the end effector 28 at a freely-selected position.

The shape detection sensor 14 is arranged at a known position in a control coordinate system C for controlling the robot 12, and detects the shape of the workpiece W. In the present embodiment, the shape detection sensor 14 is a three-dimensional vision sensor including an imaging sensor (CMOS, CCD, or the like) and an optical lens (collimator lens, focus lens, or the like) that guides a subject image to the imaging sensor, and is fixed to the end effector 28 (or the wrist flange 26*b*).

The shape detection sensor 14 is configured to capture a subject image along an optical axis A2 and measure a distance d to the subject image. Note that the shape detection sensor 14 may be fixed to the end effector 28 such that the optical axis A2 and the wrist axis A1 are parallel to each other. The shape detection sensor 14 supplies the controller 16 with shape data SD of the detected workpiece W.

As illustrated in FIG. 1, a robot coordinate system C1 and a tool coordinate system C2 are set for the robot 12. The robot coordinate system C1 is the control coordinate system C for controlling an operation of each movable element of the robot 12. In the present embodiment, the robot coordinate system C1 is fixed to the robot base 18 such that the origin thereof is arranged at the center of the robot base 18 and the z axis thereof is parallel to the vertical direction.

On the other hand, the tool coordinate system C2 is the control coordinate system C for controlling the position of the end effector 28 in the robot coordinate system C1. In the present embodiment, the tool coordinate system C2 is set with respect to the end effector 28 such that the origin (so-called TCP) is arranged at a work position (e.g., a workpiece gripping position, a welding position, or a laser beam emission port) of the end effector 28 and the z axis thereof is parallel to (specifically, coincides with) the wrist axis A1.

When moving the end effector 28, the controller 16 sets the tool coordinate system C2 in the robot coordinate system C1, and generates a command for each of the servo motors 30 of the robot 12 so as to arrange the end effector 28 at a position represented by the set tool coordinate system C2. In this way, the controller 16 can position the end effector 28 at a freely-selected position in the robot coordinate system C1. Note that, in the present description, "position" may refer to a position and orientation.

On the other hand, a sensor coordinate system C3 is set for the shape detection sensor 14. The sensor coordinate system C3 is the control coordinate system C representing the position (i.e., the direction of the optical axis A2) of the shape detection sensor 14 in the robot coordinate system C1. In the present embodiment, the sensor coordinate system C3 is set with respect to the shape detection sensor 14 such that the origin thereof is arranged at the center of the imaging sensor of the shape detection sensor 14 and the z axis thereof is parallel to (specifically, coincides with) the optical axis A2. The sensor coordinate system C3 defines coordinates of each pixel of image data (alternatively, the imaging sensor) imaged by the shape detection sensor 14.

The positional relationship between the sensor coordinate system C3 and the tool coordinate system C2 is known through calibration, and thus, the coordinates of the sensor coordinate system C3 and the coordinates of the tool coordinate system C2 can be mutually transformed through a known transformation matrix (e.g., a homogeneous transformation matrix). Furthermore, since the positional relationship between the tool coordinate system C2 and the robot coordinate system C1 is known, the coordinates of the sensor coordinate system C3 and the coordinates of the robot coordinate system C1 can be mutually transformed through the tool coordinate system C2. That is, the position (specifically, coordinates of the sensor coordinate system C3) of the shape detection sensor 14 in the robot coordinate system C1 is known.

The controller 16 controls an operation of the robot 12. Specifically, the controller 16 is a computer including a processor 32, a memory 34, and an I/O interface 36. The processor 32 includes a CPU, a GPU, or the like, is communicably connected to the memory 34 and the I/O interface 36 via a bus 38, and performs arithmetic processing for implementing various functions described below while communicating with these components.

The memory 34 includes a RAM or a ROM and temporarily or permanently stores various types of data. The I/O interface 36 includes, for example, an Ethernet (trade name) port, a USB port, an optical fiber connector, or an HDMI (trade name) terminal and communicates data with external devices by wire or wirelessly through a command from the processor 32. Each of the servo motors 30 and the shape detection sensor 14 of the robot 12 are communicably connected to the I/O interface 36.

The controller 16 is provided with a display device 40 and an input device 42. The display device 40 and the input device 42 are communicably connected to the I/O interface 36. The display device 40 includes a liquid crystal display or an organic EL display, and visibly displays various data through a command from the processor 32.

The input device 42 includes a push button, a switch, a keyboard, a mouse, or a touchscreen, and receives input data from an operator. Note that the display device 40 and the input device 42 may be integrally incorporated in a housing of the controller 16, or may be externally attached to the housing as bodies separate from the housing of the controller 16.

In order to cause the robot 12 to carry out a work on the workpiece W, the processor 32 operates the shape detection sensor 14 to detect the shape of the workpiece W, and acquires a position PR of the workpiece W in the robot coordinate system C1, based on the detected shape data SD of the workpiece W. At this time, the processor 32 operates the robot 12 to position the shape detection sensor 14 at a predetermined detection position DP with respect to the workpiece W, and causes the shape detection sensor 14 to image the workpiece W, thereby detecting the shape data SD of the workpiece W. Note that the detection position DP is represented as coordinates of the sensor coordinate system C3 in the robot coordinate system C1.

Then, by matching the detected shape data SD with a workpiece model WM modeling the workpiece W, the processor 32 acquires the position PR in the robot coordinate system C1 of the workpiece W appearing in the shape data SD. Here, for example, when the workpiece W is relatively large, the workpiece W may not fit in a detection range DR in which the shape detection sensor 14 positioned at the detection position DP can detect the workpiece W.

Figure 3:
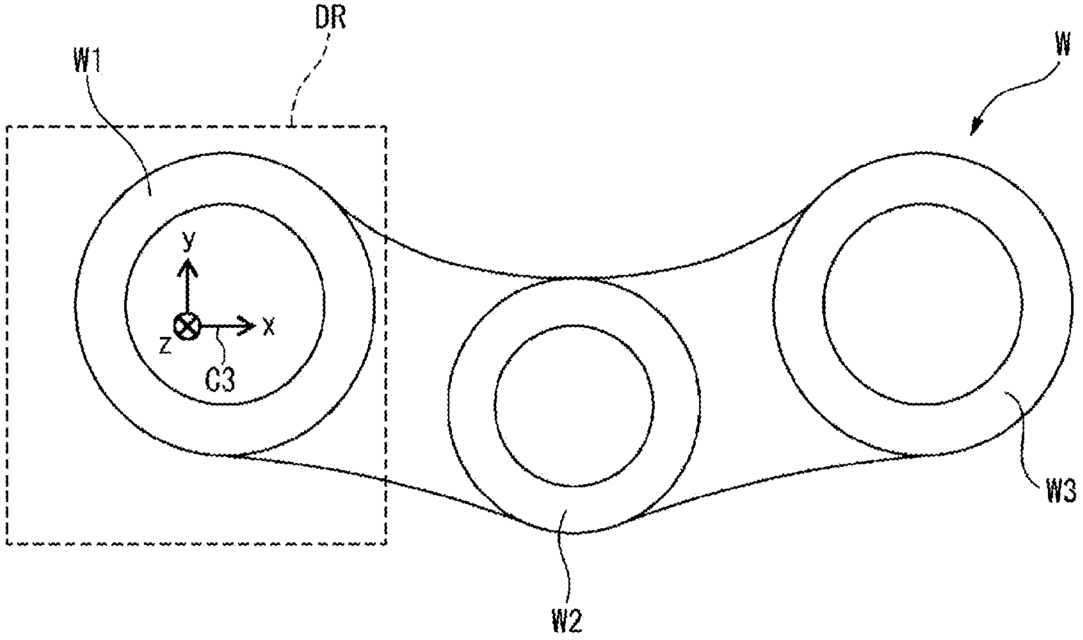
FIG. 3 schematically illustrates a detection range of a shape detection sensor when detecting a workpiece.

Such a state is schematically illustrated in FIG. 3. In the example illustrated in FIG. 3, the workpiece W includes three rings W1, W2, and W3 coupled to one another, and the ring W1 fits in the detection range DR, while the rings W2 and W3 are outside the detection range DR. This detection range DR is determined in accordance with specifications SP of the shape detection sensor 14.

In the present embodiment, the shape detection sensor 14 is a three-dimensional vision sensor as described above, and the specifications SP thereof include the number of pixels PX of the imaging sensor, a viewing angle φ, and a data table DT indicating the relationship between a distance δ from the shape detection sensor 14 and an area E of the detection range DR. Therefore, the detection range DR of the shape detection sensor 14 positioned at the detection position DP is determined by the distance δ from the shape detection sensor 14 positioned at the detection position DP and the above-described data table DT.

Figure 4:
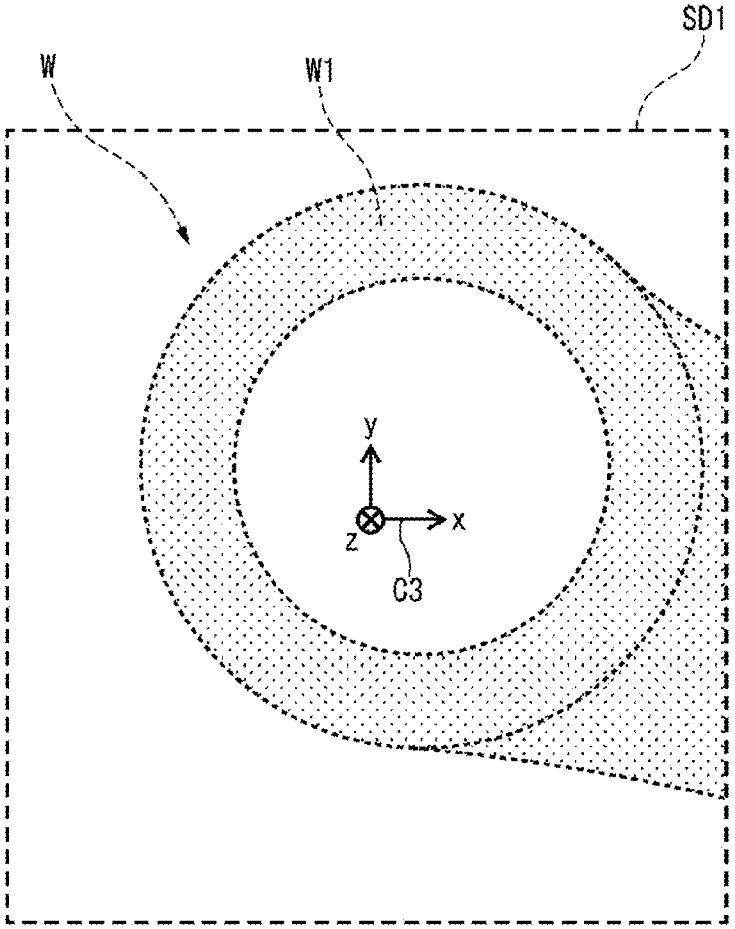
FIG. 4 is an example of shape data of a workpiece detected by the shape detection sensor in the detection range of FIG. 3.

FIG. 4 illustrates shape data SD1 of the workpiece W detected by the shape detection sensor 14 in the state illustrated in FIG. 3. In the present embodiment, the shape detection sensor 14 detects the shape data SD1 as three-dimensional point cloud image data. In the shape data SD1, visual features (edge, surface, and the like) of the workpiece W are indicated by a point cloud, and each point constituting the point cloud has information on the distance d described above, and can therefore be represented as three-dimensional coordinates (Xs, Ys, Zs) of the sensor coordinate system C3.

As illustrated in FIG. 4, in a case where only a portion of the workpiece W appears in the shape data SD1, even if the processor 32 executes model matching MT of matching the workpiece model WM with the workpiece W appearing in the shape data SD1 on an image, a coincidence degree u between the workpiece W appearing in the shape data SD1 and the workpiece model WM may decrease. In this case, the processor 32 fails to match the workpiece W with the workpiece model WM in the shape data SD1, and as a result, the position PR of the workpiece W in the robot coordinate system C1 may possibly not be accurately acquired from the shape data SD1.

Therefore, in the present embodiment, the processor 32 limits the workpiece model WM to a part thereof so as to correspond to the portion of the workpiece W appearing in the shape data SD1 for use in the model matching MT. This function will be described below. First, the processor 32 acquires the workpiece model WM modeling the workpiece W.

Figure 5:
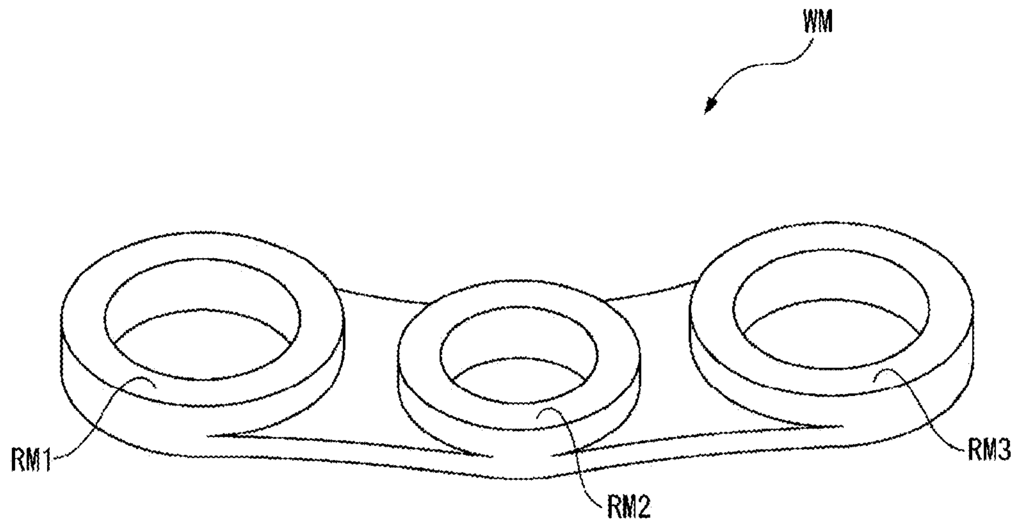
FIG. 5 illustrates an example of a workpiece model.

As illustrated in FIG. 5, the workpiece model WM is three-dimensional data representing the visual features of the three-dimensional shape of the workpiece W, and includes a ring model RM1 modeling the ring W1, a ring model RM2 modeling the ring W2, and a ring model RM3 modeling the ring W3.

The workpiece model WM includes, for example, a CAD model $WM_C$ of the workpiece W and a point cloud model $WM_P$ representing model components (edge, surface, and the like) of the CAD model $WM_C$ as a point cloud (or normal line). The CAD model $WM_C$ is a three-dimensional CAD model and is created in advance by the operator using a CAD device (not illustrated). On the other hand, the point cloud model $WM_P$ is a three-dimensional model representing, with a point cloud (or normal line), the model components included in the CAD model $WM_C$.

The processor 32 may generate the point cloud model $WM_P$ by acquiring the CAD model $WM_C$ from the CAD device and imparting the point cloud to the model component of the CAD model $WM_C$ in accordance with a predetermined image generation algorithm. The processor 32 stores the acquired workpiece model WM (the CAD model $WM_C$ or the point cloud model $WM_P$) in the memory 34. In this manner, the processor 32 functions as a model acquiring unit 44 (FIG. 2) that acquires the workpiece model WM.

Figure 6:
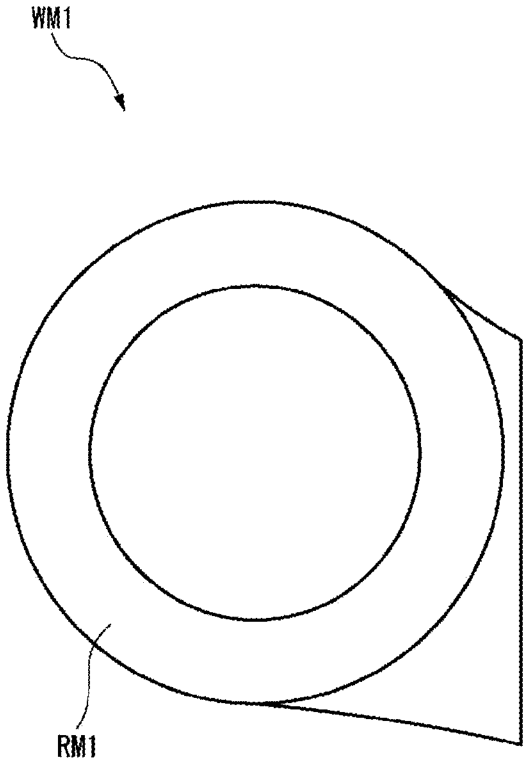
FIG. 6 is an example of a partial model obtained by limiting the workpiece model illustrated in FIG. 5 to a part thereof.

Subsequently, the processor 32 generates a partial model WM1 obtained by limiting the acquired workpiece model WM to a part thereof. FIG. 6 illustrates an example of the partial model WM1 obtained by limiting the workpiece model WM so as to correspond to the portion of the workpiece W appearing in the shape data SD1 of FIG. 4. The partial model WM1 illustrated in FIG. 6 is a part (i.e., a part including the ring model RM1) corresponding to the portion (i.e., the portion including the ring W1) of the workpiece W appearing in the shape data SD1 of FIG. 4 of the workpiece model WM illustrated in FIG. 5.

Using the model data (specifically, data of the CAD model $WM_C$ or the point cloud model $WM_P$) of the workpiece model WM, the processor 32 limits the workpiece model WM to the part of the workpiece W illustrated in FIG. 6, thereby newly generating the partial model WM1 as model data different from the workpiece model WM.

In this manner, in the present embodiment, the processor 32 functions as a partial model generating unit 46 (FIG. 2) that generates the partial model WM1. The processor 32 generates the partial model WM1 as, for example, a CAD model WM1*c* or a point cloud model WM1*p*, and stores the generated partial model WM1 in the memory 34.

Note that the processor 32 may generate, as the partial model WM1, a data set of the model data of the CAD model WM1*c* or the point cloud model WM1*p*, feature points FPm included in the model data, and a matching parameter PR. The matching parameter PR is a parameter used for the model matching MT described below, and includes, for example, approximate dimensions DS of the workpiece model WM (i.e., the workpiece W), and a displacement amount DA by which the partial model WM1 is displaced in a virtual space in the model matching MT. In this case, the processor 32 may acquire the approximate dimensions DS from the workpiece model WM and automatically determine the displacement amount DA from the approximate dimensions DS.

Subsequently, by matching (model matching MT) the partial model WM1 generated as the partial model generating unit 46 with the shape data SD1 detected by the shape detection sensor 14, the processor 32 acquires a position P (first position) in the control coordinate system C of a portion (portion including the ring W1) of the workpiece W corresponding to the partial model WM1.

Specifically, in the model matching MT, the processor 32 arranges the partial model WM1 in the virtual space defined by the sensor coordinate system C3 set in the shape data SD1, obtains a coincidence degree μ1 between the partial model WM1 and the shape data SD1, and compares the obtained coincidence degree μ1 with a predetermined threshold value $\mu 1_{th}$, thereby determining whether or not the partial model WM1 matches the shape data SD1.

An example of the model matching MT will be described below. In accordance with a predetermined matching algorithm MA, the processor 32 repeatedly displaces, in the sensor coordinate system C3, by the displacement amount DA included in the matching parameter PR, the position of the partial model WM1 arranged in the virtual space defined by the sensor coordinate system C3.

Every time the position of the partial model WM1 is displaced, the processor 32 obtains a coincidence degree $\mu 1_{}_1$ between the feature points FPm included in the partial model WM1 and feature points FPw of the portion of the workpiece W appearing in the shape data SD1. Note that the feature points FPm and FPw are, for example, relatively complex features including a plurality of edges, surfaces, holes, grooves, protrusions, or combinations thereof, and are easily extracted by a computer through image processing, and the partial model WM1 and the shape data SD1 may include a plurality of the feature points FPm and a plurality of the feature points FPw corresponding to the feature points FPm.

The coincidence degree $\mu 1_{}_1$ includes an error in distance between, for example, the feature points FPm and the feature points FPw corresponding to the feature points FPm. In this case, the more the feature points FPm and the feature points FPw coincide with each other in the sensor coordinate system C3, the smaller the value of the coincidence degree $\mu 1_{}_1$ is. Alternatively, the coincidence degree $\mu 1_{}_1$ includes a similarity degree representing similarity between the feature points FPm and the feature points FPw corresponding to the feature points FPm. In this case, the more the feature points FPm and the feature points FPw coincide with each other in the sensor coordinate system C3, the larger the value of the coincidence degree $\mu 1_{}_1$ is.

Then, the processor 32 compares the obtained coincidence degree $\mu 1_{}_1$ with a predetermined threshold value $\mu 1_{th1}$ with respect to the coincidence degree $\mu 1_{}_1$, and when the coincidence degree $\mu 1_{}_1$ exceeds the threshold value $\mu 1_{th1}$ (i.e., $\mu 1_{}_1 \leq \mu 1_{th1}$, or $\mu 1_{}_1 \geq \mu 1_{th1}$), determines that the feature points FPm and FPw coincide with each other in the sensor coordinate system C3.

Then, the processor 32 determines whether or not a number ν1 of a pair of the feature points FPm and FPw determined to coincide with each other exceeds a predetermined threshold value $\nu_{th1}$ ($\nu 1 \geq \nu_{th1}$), and acquires, as an initial position $P0_1$, the position in the sensor coordinate system C3 of the partial model WM1 at the time of determining that $\nu_1 \geq \nu_{th1}$ (initial position searching).

Subsequently, with respect to the initial position $P0_1$ acquired in the initial position searching, the processor 32 searches for a position where the partial model WM1 highly matches the shape data SD1 in the sensor coordinate system C3 in accordance with the matching algorithm MA (e.g., a mathematical optimization algorithm such as Iterative Closest Point: ICP) (aligning). As an example of the aligning, the processor 32 obtains a coincidence degree $\mu 1_{}_2$ between the point cloud of the point cloud model $WM_P$ arranged in the sensor coordinate system C3 and the three-dimensional point cloud of the shape data SD1. For example, this coincidence degree $\mu 1_{}_2$ includes an error in distance between the point cloud of the point cloud model $WM_P$ and the three-dimensional point cloud of the shape data SD1, or a similarity degree between the point cloud of the point cloud model $WM_P$ and the three-dimensional point cloud of the shape data SD1.

Then, the processor 32 compares the obtained coincidence degree $\mu 1_{}_2$ with a predetermined threshold value $\mu 1_{th2}$ with respect to the coincidence degree $\mu 1_{}_2$, and when the coincidence degree $\mu 1_{}_2$ exceeds the threshold value $\mu 1_{th2}$ (i.e., $\mu 1_{}_2 \leq \mu 1_{th2}$, or $\mu 1_{}_2 \geq \mu 1_{th2}$), determines that the partial model WM1 and the shape data SD1 match precisely in the sensor coordinate system C3.

In this manner, the processor 32 executes the model matching MT (e.g., the initial position searching and the aligning) of matching the partial model WM1 to the portion of the workpiece W appearing in the shape data SD1. Note that the method of the model matching MT described above is an example, and the processor 32 may execute the model matching MT in accordance with any other matching algorithm MA.

Figure 7:
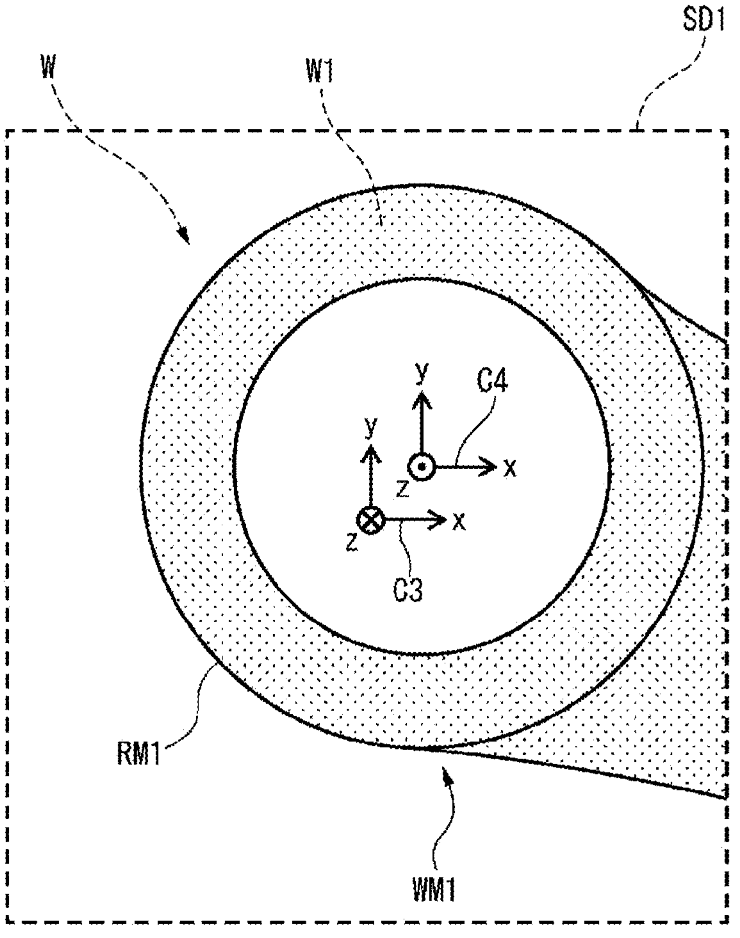
FIG. 7 illustrates a state in which the partial model illustrated in FIG. 6 is matched with the shape data illustrated in FIG. 4.

Subsequently, the processor 32 sets a workpiece coordinate system C4 with respect to the partial model WM1 matched precisely with the shape data SD1. This state is illustrated in FIG. 7. In the example illustrated in FIG. 7, with respect to the partial model WM1 matched with the portion of the workpiece W appearing in the shape data SD1, the processor 32 sets, in the sensor coordinate system C3, the workpiece coordinate system C4 such that the origin thereof is arranged at the center of the ring model RM1 and the z axis thereof coincides with the center axis of the ring model RM1. The workpiece coordinate system C4 is the control coordinate system C representing the position of a portion (i.e., a portion of the ring W1) of the workpiece W appearing in the shape data SD1.

Then, the processor 32 acquires coordinates $P1_S$ ($X1_S$, $Y1_S$, $Z1_S$, $W1_S$, $P1_S$, and $R1_S$) in the sensor coordinate system C3 of the set workpiece coordinate system C4 as data of a position $P1_S$ (first position) in the sensor coordinate system C3 of the portion (ring W1) of the workpiece W appearing in the shape data SD1. Here, in the coordinates $P1_S$, ($X1_S$, $Y1_S$, and $Z1_S$) indicate an origin position of the workpiece coordinate system C4 in the sensor coordinate system C3, and ($W1_S$, $P1_S$, and $R1_S$) indicate the direction (so-called yaw, pitch, and roll) of each axis of the workpiece coordinate system C4 in the sensor coordinate system C3.

Subsequently, using a known transformation matrix, the processor 32 transforms the acquired coordinates $P1_S$ into coordinates $P1_R$ ($X1_R$, $Y1_R$, $Z1_R$, $W1_R$, $P1_R$, and $R1_R$) of the robot coordinate system C1. These coordinates $P1_R$ are data indicating the position (first position) in the robot coordinate system C1 of the portion (ring W1) of the workpiece W appearing in the shape data SD1.

In this manner, in the present embodiment, the processor 32 functions as a position acquiring unit 48 (FIG. 2) that acquires the position P1 ($P1_S$ and $P1_R$) in the control coordinate system C (the sensor coordinate system C3 and the robot coordinate system C1) of the portion (ring W1) of the workpiece W corresponding to the partial model WM1, by matching the partial model WM1 with the shape data SD1.

As described above, in the present embodiment, the processor 32 functions as the model acquiring unit 44, the partial model generating unit 46, and the position acquiring unit 48, and based on the shape data SD1 of the workpiece W detected by the shape detection sensor 14, acquires the position P1 of the workpiece W (ring W1) in the control coordinate system C. Therefore, the model acquiring unit 44, the partial model generating unit 46, and the position acquiring unit 48 constitute a device 50 (FIG. 1) that acquires the position P1 of the workpiece W, based on the shape data SD1.

In this manner, in the present embodiment, the device 50 includes the model acquiring unit 44 that acquires the workpiece model WM, the partial model generating unit 46 that generates the partial model WM1 obtained by limiting the workpiece model WM to a part thereof (a part including the ring model RM1) using the acquired workpiece model WM, and the position acquiring unit 48 that acquires the position P1 in the control coordinate system C of a portion (a portion including the ring W1) of the workpiece W corresponding to the partial model WM1, by matching the partial model WM1 with the shape data SD1 detected by the shape detection sensor 14.

According to this device 50, even when the workpiece W does not fit in the detection range DR of the shape detection sensor 14 as illustrated in FIG. 3, the position P1 of a portion W1 of the workpiece W detected by the shape detection sensor 14 can be acquired by executing the model matching MT using the partial model WM1 obtained by limiting the workpiece model WM to a part thereof. Therefore, even when the workpiece W is relatively large or the like, the position P1 in the control coordinate system C (e.g., the robot coordinate system C1) can be accurately acquired, and as a result, a work on the workpiece W can be carried out with high accuracy based on the position P1.

Figure 8:
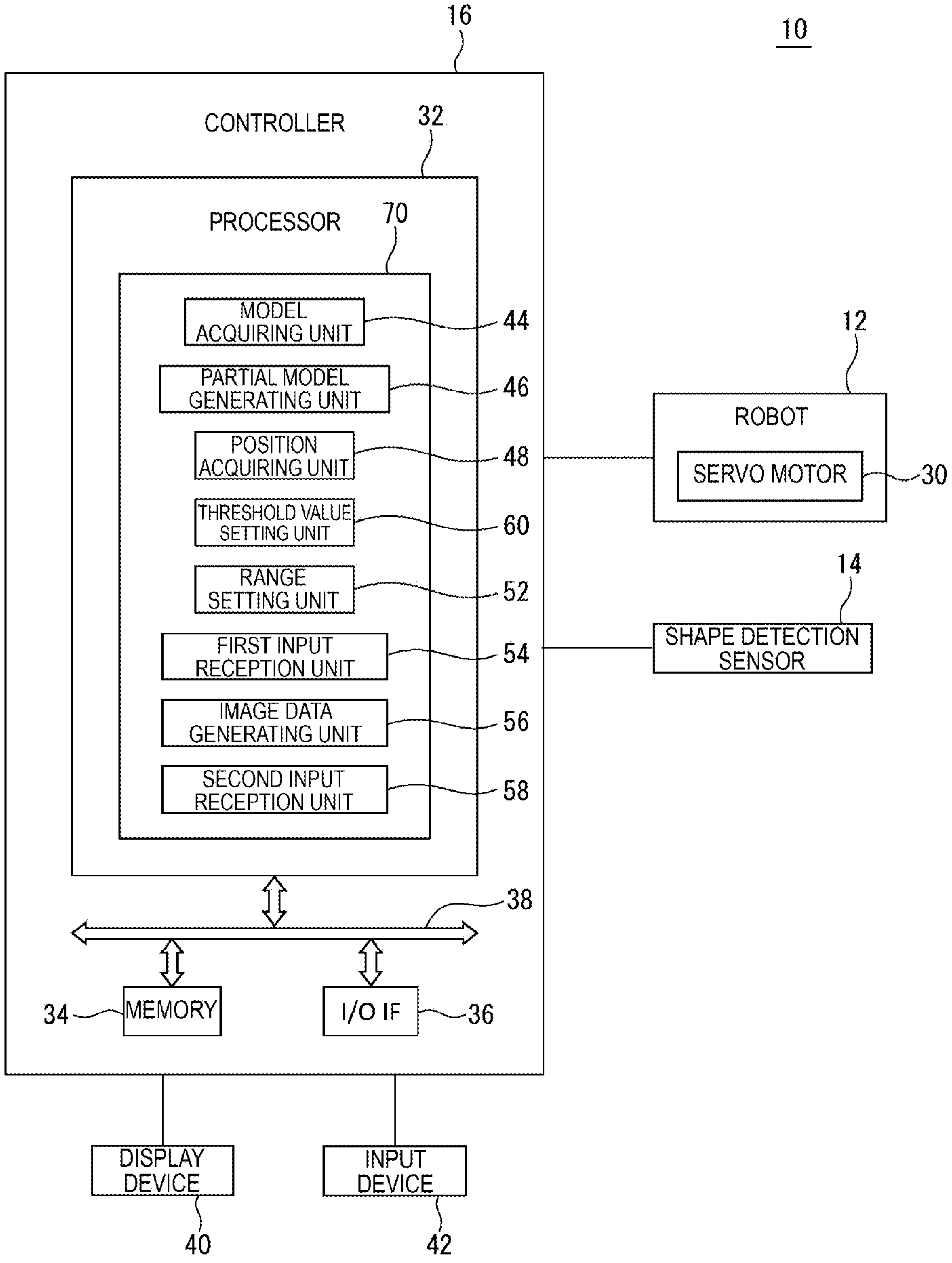
FIG. 8 is a block diagram of a robot system according to another embodiment.
Figure 9:
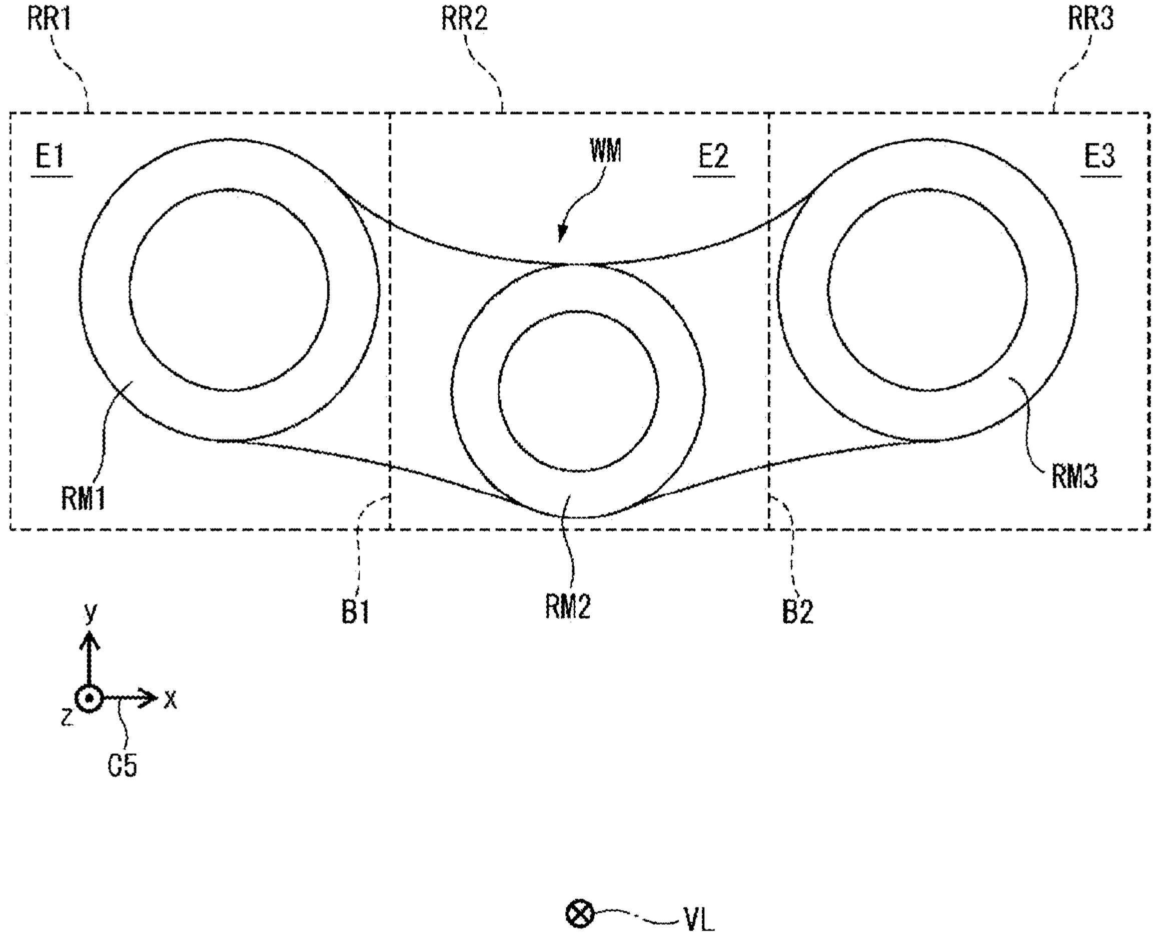
FIG. 9 illustrates an example of a limit range set in a workpiece model.

Subsequently, another function of the robot system 10 will be described with reference to FIG. 8. In the present embodiment, the processor 32 sets a limit range RR for limiting the workpiece model WM to a part thereof, with respect to the workpiece model WM that the processor 32 has acquired functioning as the model acquiring unit 44. An example of the limit range RR is illustrated in FIG. 9. In the example illustrated in FIG. 9, the processor 32 sets three limit ranges RR1, RR2, and RR3 with respect to the workpiece model WM. The limit ranges RR1, RR2, and RR3 are quadrangular ranges having predetermined areas E1, E2, and E3, respectively.

More specifically, the processor 32 sets a model coordinate system C5 with respect to the workpiece model WM (CAD model $WM_C$ or point cloud model $WM_P$) that the processor 32 has acquired functioning as the model acquiring unit 44. This model coordinate system C5 is a coordinate system defining the position of the workpiece model WM, and each model component (edge, surface, and the like) constituting the workpiece model WM is represented as coordinates of the model coordinate system C5. Note that the model coordinate system C5 may be set in advance in the CAD model $WM_C$ acquired from the CAD device.

In the example illustrated in FIG. 9, the model coordinate system C5 is set with respect to the workpiece model WM such that the z axis thereof is parallel to the center axes of the ring models RM1, RM2, and RM3 included in the workpiece model WM. Note that in the following description, the direction of the workpiece model WM illustrated in FIG. 9 is "front". In a case where the workpiece model WM is viewed from the front as illustrated in FIG. 9, a virtual visual-line direction VL in which the workpiece model WM is viewed is parallel to the z axis direction of the model coordinate system C5.

The processor 32 sets, with reference to the model coordinate system C5, the limit ranges RR1, RR2, and RR3 with respect to the workpiece model WM in a state of being viewed from the front as illustrated in FIG. 9 based on the position of the workpiece model WM in the model coordinate system C5. In this manner, in the present embodiment, the processor 32 functions as a range setting unit 52 (FIG. 8) that sets the limit ranges RR1, RR2, and RR3 with respect to the workpiece model WM.

Here, in the present embodiment, the processor 32 automatically sets the limit ranges RR1, RR2, and RR3 based on the detection range DR in which the shape detection sensor 14 detects the workpiece W. More specifically, the processor 32 first acquires the specifications SP of the shape detection sensor 14 and the distance δ from the shape detection sensor 14.

As an example, the processor 32 acquires, as the distance δ, a distance from the shape detection sensor 14 to the center position of the detection range (so-called depth of field) in the direction of the optical axis A2 of the shape detection sensor 14. As another example, the processor 32 may acquire a focal length of the shape detection sensor 14 as the distance δ. In a case where the distance δ is the distance from the shape detection sensor 14 to the center position of the detection range (so-called depth of field) or the focal length, the distance δ may be defined in advance in the specifications SP. As yet another example, the operator may operate the input device 42 to input a freely-selected distance δ, and the processor 32 may acquire the distance δ through the input device 42.

Then, the processor 32 obtains the detection range DR from the acquired distance δ and the above-described data table DT included in the specifications SP, and determines the limit ranges RR1, RR2, and RR3 in accordance with the obtained detection range DR. As an example, the processor 32 determines the areas E1, E2 and E3 of the limit ranges RR1, RR2 and RR3 so as to coincide with the area E of the detection range DR.

As another example, the processor 32 may determine the areas E1, E2, and E3 of the limit ranges RR1, RR2, and RR3 to be equal to or smaller than the area E of the detection range DR. In this case, the processor 32 may set the areas E1, E2, and E3 to values in which the area E of the detection range DR is multiplied by a predetermined coefficient α (<1). Note that the areas E1, E2, and E3 may be the same as one another (i.e., the limit ranges RR1, RR2 and RR3 may be ranges of the same outer shape having the same area as one another).

As illustrated in FIG. 9, the processor 32 determines the limit ranges RR1, RR2, and RR3 such that boundaries B1 of the limit ranges RR1 and RR2 coincide with each other and boundaries B2 of the limit ranges RR2 and RR3 coincide with each other. In consideration of the positional relationship between the model coordinate system C5 and the virtual visual-line direction VL, the processor 32 determines the limit ranges RR1, RR2, and RR3 such that the workpiece model WM viewed from the front as illustrated in FIG. 9 fits inside the limit ranges RR1, RR2, and RR3.

As a result, as illustrated in FIG. 9, the processor 32 can automatically set, in the model coordinate system C5, the limit ranges RR1, RR2, and RR3 respectively having the areas E1, E2, and E3, the boundaries B1 and B2 coinciding with each other and the workpiece model WM viewed from the front fitting inside of the limit ranges RR1, RR2, and RR3.

Alternatively, the operator may manually define the limit ranges RR1, RR2 and RR3. Specifically, the processor 32 displays image data of the workpiece model WM on the display device 40, and the operator operates the input device 42 while visually recognizing the workpiece model WM displayed on the display device 40, and provides the processor 32 with an input IP1 for manually defining the limit ranges RR1, RR2, and RR3 in the model coordinate system C5.

For example, this input IP1 may be an input of coordinates of each vertex of the limit ranges RR1, RR2, and RR3, an input of the areas E1, E2, and E3, or an input for enlarging or reducing the boundaries of the limit ranges RR1, RR2, and RR3 through a drag and drop operation. The processor 32 receives the input IP1 from the operator through the input device 42, functions as the range setting unit 52, and sets the limit ranges RR1, RR2, and RR3 to the model coordinate system C5 in response to the received input IP1. In this manner, in the present embodiment, the processor 32 functions as a first input reception unit 54 (FIG. 8) that receives the input IP1 for defining the limit ranges RR1, RR2, and RR3.

Figure 10:
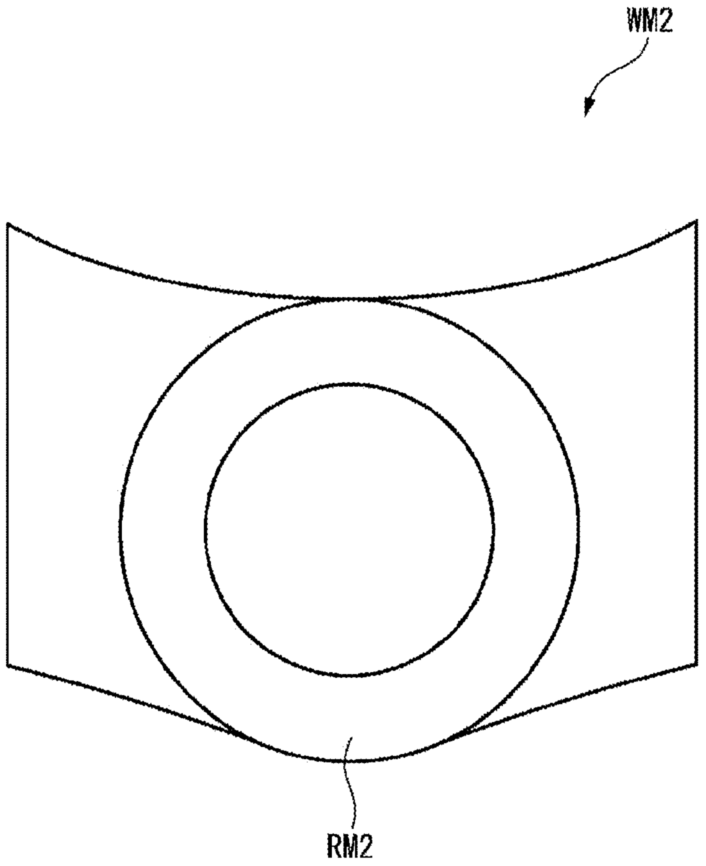
FIG. 10 illustrates an example of a partial model generated in accordance with the limit range illustrated in FIG. 9.
Figure 11:
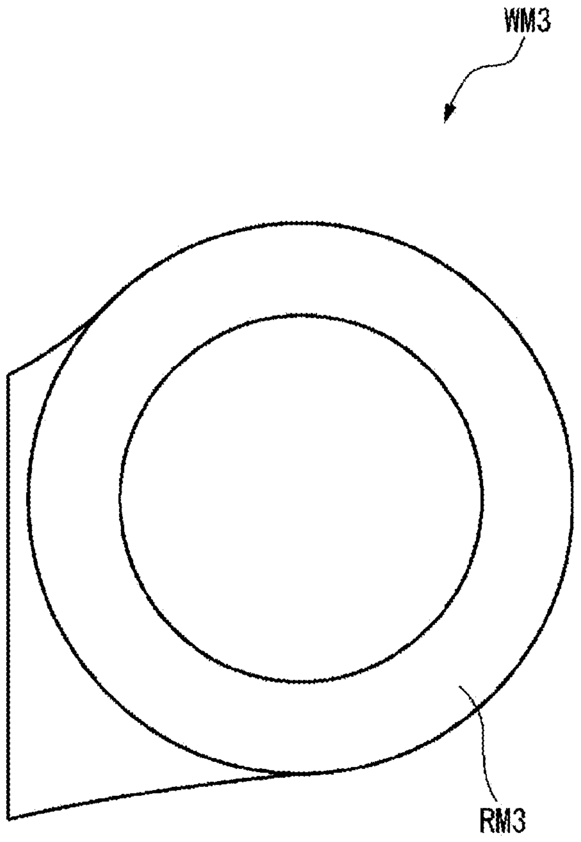
FIG. 11 illustrates an example of a partial model generated in accordance with the limit range illustrated in FIG. 9.

After setting the limit ranges RR1, RR2, and RR3, the processor 32 functions as the partial model generating unit 46 and limits the workpiece model WM in accordance with the set limit ranges RR1, RR2, and RR3, thereby generating each of three partial models of the partial model WM1 (FIG. 6), a partial model WM2 (FIG. 10), and a partial model WM3 (FIG. 11).

Specifically, using the model data (data of the CAD model $WM_C$ or the point cloud model $WM_P$) of the workpiece model WM, the processor 32 limits the workpiece model WM to a part of the workpiece model WM included in a virtual projection region in which the limit range RR1 set in the model coordinate system C5 is projected in the virtual visual-line direction VL (in this example, the z axis direction of the model coordinate system C5), thereby generating, as data different from the workpiece model WM, the partial model WM1 including the ring model RM1 illustrated in FIG. 6.

Similarly, the processor 32 limits the workpiece model WM to a part of the workpiece model WM included in a virtual projection region in which the limit ranges RR2 and RR3 are projected in the virtual visual-line direction VL (the z axis direction of the model coordinate system C5), thereby generating, as data different from the workpiece model WM, the partial model WM2 including the ring model RM2 illustrated in FIG. 10 and the partial model WM3 including the ring model RM3 illustrated in FIG. 11. Note that the processor 32 may generate the partial models WM1, WM2, and WM3 in the data format of the CAD model $WM_C$ or the point cloud model $WM_P$.

In this way, the processor 32 generates the three partial models WM1, WM2, and WM3 by dividing the entire workpiece model WM into three parts (a part including the ring model RM1, a part including the ring model RM2, and a part including the ring model RM3) in accordance with the limit ranges RR1, RR2, and RR3.

Figure 12:
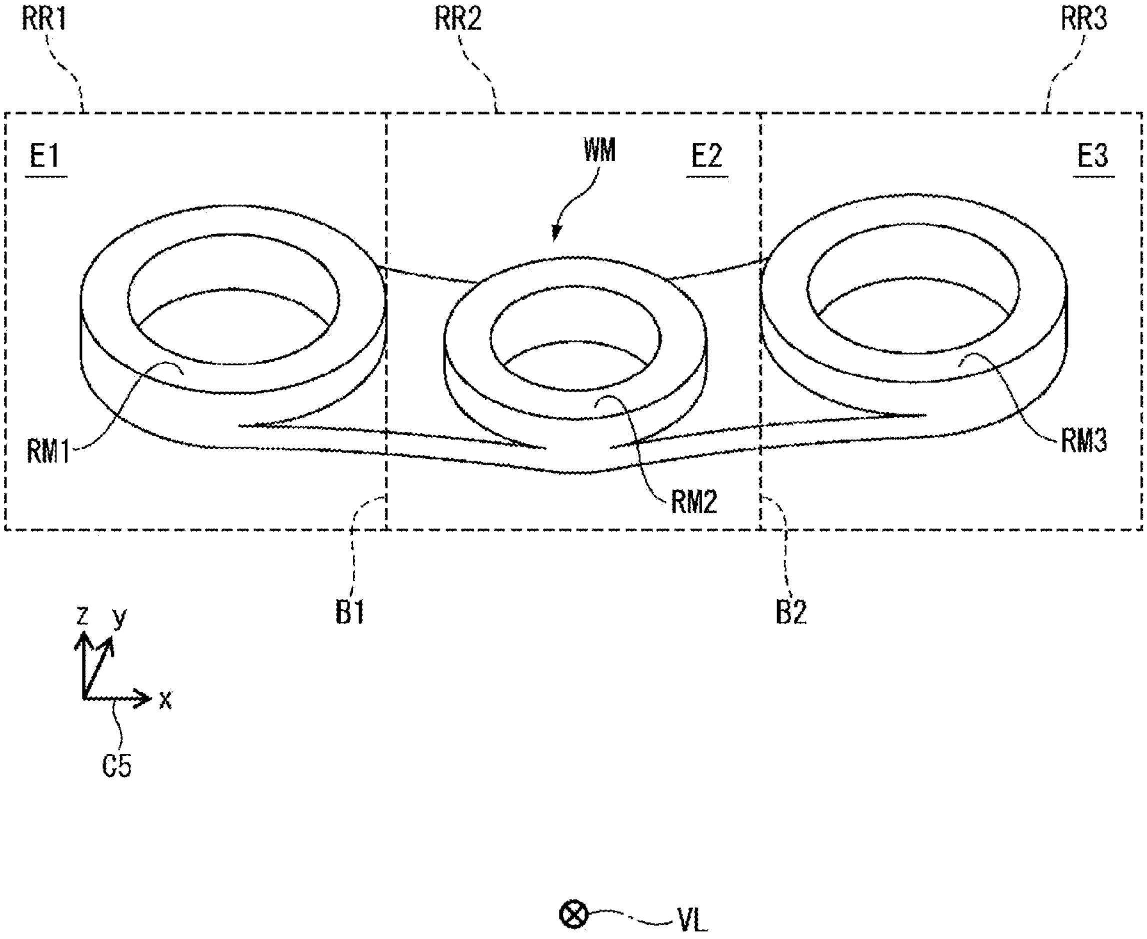
FIG. 12 illustrates another example of a limit range set in a workpiece model.

Subsequently, the processor 32 again sets the limit ranges RR1, RR2, and RR3 in a state where the orientation of the workpiece model WM viewed from the front illustrated in FIG. 9 is changed. Such an example is illustrated in FIG. 12. In the example illustrated in FIG. 12, by rotating the direction of the workpiece model WM about the x axis of the model coordinate system C5 from the state of the front illustrated in FIG. 9, the orientation of the workpiece model WM (alternatively, the model coordinate system C5) is changed with respect to the virtual visual-line direction VL in which the workpiece model WM is viewed.

Then, the processor 32 functions as the range setting unit 52, and sets, using the above-described method with respect to the workpiece model WM whose orientation is changed in this manner, the limit ranges RR1, RR2, and RR3 in the model coordinate system C5, the limit ranges RR1, RR2, and RR3 respectively including the areas E1, E2, and E3, the boundaries B1 and B2 thereof coinciding with each other, and the workpiece model WM fitting therein.

Figure 13:
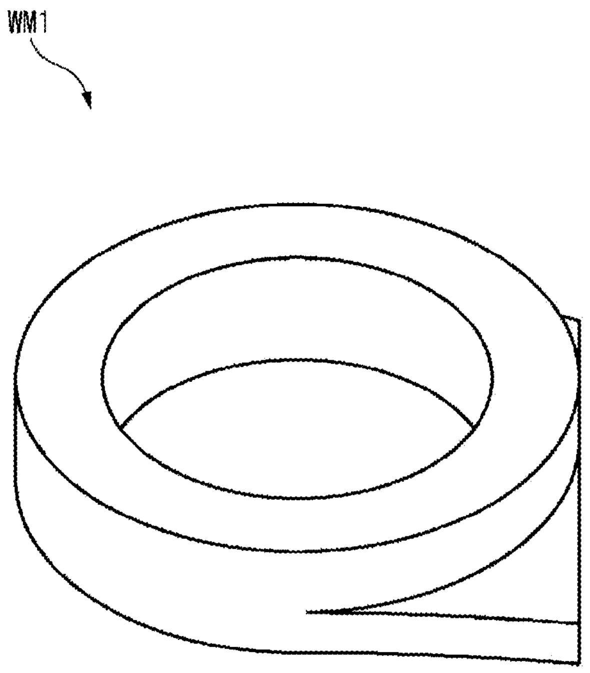
FIG. 13 illustrates an example of a partial model generated in accordance with the limit range illustrated in FIG. 12.
Figure 14:
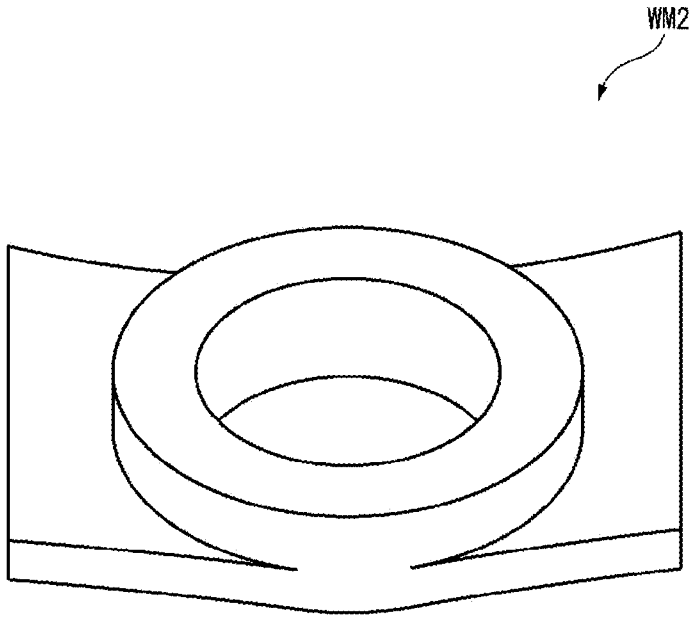
FIG. 14 illustrates an example of a partial model generated in accordance with the limit range illustrated in FIG. 12.
Figure 15:
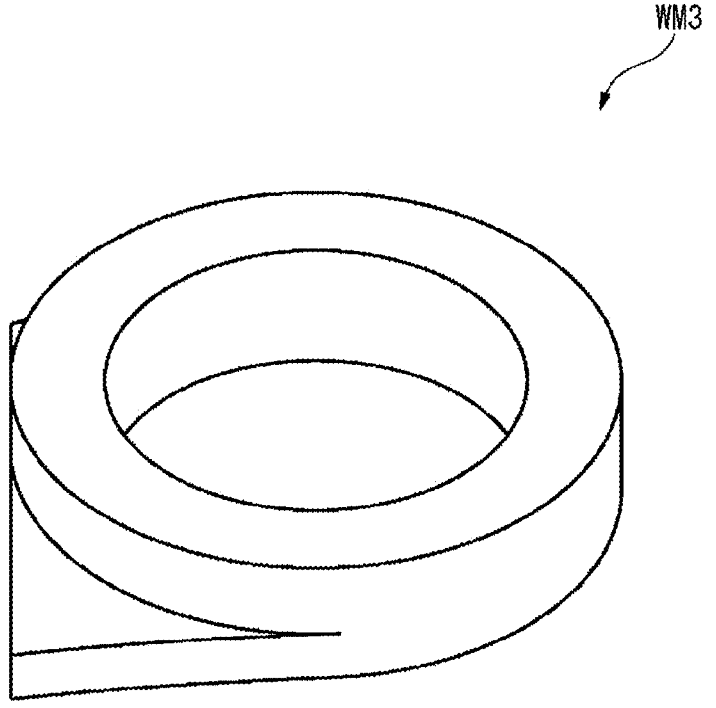
FIG. 15 illustrates an example of a partial model generated in accordance with the limit range illustrated in FIG. 12.

Then, the processor 32 generates the partial model WM1 illustrated in FIG. 13, the partial model WM2 illustrated in FIG. 14, and the partial model WM3 illustrated in FIG. 15 by limiting the workpiece model WM to a part of the workpiece model WM included in the virtual projection region in which the limit ranges RR1, RR2, and RR3 are projected in the virtual visual-line direction VL (front-back direction of the page on which FIG. 12 is printed).

Note that in the partial models WM1, WM2, and WM3 generated as described above may have only the model data of the front side visible along the virtual visual-line direction VL and need not have the model data of the back side invisible along the virtual visual-line direction VL. For example, when generating the partial model WM1 illustrated in FIG. 13 as the point cloud model WM1*p*, the processor 32 generates the model data of the point cloud of the model component that is visible from the front side of the page on which FIG. 13 has been printed, but does not generate the model data of the point cloud of the model component that is invisible from the front side of the page on which FIG. 13 has been printed (i.e., the edge, the surface, and the like on the back side of the page on which FIG. 13 has been printed). This configuration can reduce the data amount of the partial models WM1, WM2, and WM3 to be generated.

In this way, the processor 32 sets the limit ranges RR1, RR2, and RR3 for the workpiece model WM arranged at the plurality of orientations, and limits the workpiece model WM in accordance with the limit ranges RR1, RR2, and RR3, thereby generating the partial models WM1, WM2, and WM3 limited at the plurality of orientations. The processor 32 stores the generated partial models WM1, WM2, and WM3 in the memory 34.

As described above, in the present embodiment, the processor 32 functions as the partial model generating unit 46 and generates the plurality of partial models WM1, WM2, and WM3 obtained by limiting the workpiece model WM to the plurality of parts (the part including the ring model RM1, the part including the ring model RM2, and the part including the ring model RM3).

Subsequently, the processor 32 respectively generates image data ID1, ID2, and ID3 of the partial models WM1, WM2, and WM3 that the processor 32 has generated functioning as the partial model generating unit 46. Specifically, the processor 32 generates and sequentially displays, on the display device 40, the image data ID1 of the partial model WM1 limited in the plurality of orientations illustrated in FIGS. 6 and 13.

Similarly, the processor 32 generates the image data ID2 of the partial model WM2 limited in the plurality of orientations illustrated in FIGS. 10 and 14, generates the image data ID3 of the partial model WM3 limited in the plurality of orientations illustrated in FIGS. 11 and 15, and sequentially displays the image data on the display device 40.

By visually recognizing the image data ID1, ID2, and ID3 displayed on the display device 40, the operator can confirm whether or not the workpiece model WM is appropriately limited (specifically, divided) to the partial models WM1, WM2, and WM3, respectively. In this manner, in the present embodiment, the processor 32 functions as an image data generating unit 56 (FIG. 8) that generates the image data ID1, ID2, and ID3.

Subsequently, the processor 32 receives an input IP2 that permits use of the partial models WM1, WM2, and WM3 for the model matching MT through the image data ID1, ID2, and ID3 that the processor 32 has generated functioning as the image data generating unit 56. Specifically, in a case where the operator determines that the displayed partial model WM1, WM2, or WM3 is appropriately limited as a result of visually recognizing the image data ID1, ID2, or ID3 sequentially displayed on the display device 40, the operator operates the input device 42 to give the processor 32 the input IP2 for permitting use of the partial model WM1, WM2, or WM3. In this manner, the processor 32 functions as a second input reception unit 58 (FIG. 8) that receives the input IP2 that permits use of the partial models WM1, WM2, and WM3.

Note that in a case where the processor 32 does not receive the input IP2 (alternatively, receives an input IP2' that does not permit use of the partial model WM1, WM2, or WM3), the operator may operate the input device 42 to give the processor 32 the input IP1 for manually defining the limit range RR1, RR2, or RR3 in the model coordinate system C5 through the generated image data ID1, ID2, or ID3.

For example, while visually recognizing the image data ID1, ID2, or ID3, the operator may operate the input device 42 to give the processor 32, through the image data ID1, ID2, or ID3, the input IP1 of the coordinates of each vertex of the limit range RR1, RR2, or RR3 set in the model coordinate system C5, of the areas E1, E2, and E3, or for changing the boundaries. Alternatively, the operator may operate the input device 42 to give the processor 32, through the image data ID1, ID2, or ID3, the input IP1 for canceling the limit range RR1, RR2, or RR3 set in the model coordinate system C5, or for adding a new limit range RR4 in the model coordinate system C5.

In this case, the processor 32 may function as the first input reception unit 54 to receive the input IP1, and may function as the range setting unit 52 to again set again the limit range RR1, RR2, RR3, or RR4 in the model coordinate system C5 in accordance with the received input IP1. Then, the processor 32 may generate the new partial models WM1, WM2, and WM3 (alternatively, the partial models WM1, WM2, WM3, and WM4) in accordance with the newly set limit ranges RR1, RR2, and RR3 (or the limit ranges RR1, RR2, RR3 and RR4).

On the other hand, upon receiving the input IP2 that permits use of the partial models WM1, WM2, and WM3, the processor 32 individually sets the threshold value $\mu_{th}$ of the coincidence degree μ used in the model matching MT with respect to the generated partial models WM1, WM2, and WM3, respectively. As an example, the operator operates the input device 42 to input the first threshold value $\mu 1_{th}$ (e.g., $\mu 1_{th1}$ and $\mu 1_{th2}$) with respect to the partial model WM1, the second threshold value $\mu_{th}$ (e.g., $\mu 2_{th1}$ and $\mu 2_{th2}$) with respect to the partial model WM2, and a third threshold value $\mu_{th}$ (e.g., $\mu 3_{th1}$ and $\mu 3_{th2}$) with respect to the partial model WM3.

The processor 32 receives the input IP3 of the threshold values $\mu 1_{th}$, $\mu 2_{th}$, and $\mu 3_{th}$ from the operator through the input device 42, sets the threshold value $\mu 1_{th}$ with respect to the partial model WM1, sets the threshold value $\mu 2_{th}$ with respect to the partial model WM2, and sets the threshold value $\mu 3_{th}$ with respect to the partial model WM3 in accordance with the input IP3.

Alternatively, the processor 32 may automatically set the threshold values $\mu 1_{th}$, $\mu 2_{th}$, and $\mu 3_{th}$ based on the model data of the partial models WM1, WM2, and WM3 without receiving the input IP3. Note that the threshold values $\mu 1_{th}$, $\mu 2_{th}$, and $\mu 3_{th}$ may be set to values different from one another, or at least two of the threshold values $\mu 1_{th}$, $\mu 2_{th}$, and $\mu 3_{th}$ may be set to the same value as each other. In this manner, in the present embodiment, the processor 32 functions as a threshold value setting unit 60 (FIG. 8) that individually sets the threshold values $\mu 1_{th}$, $\mu 2_{th}$, and $\mu 3_{th}$ with respect to the plurality of partial models WM1, WM2, and WM3, respectively.

Subsequently, similarly to the embodiments described above, the processor 32 functions as the position acquiring unit 48 to execute the model matching MT of matching the partial models WM1, WM2, and WM3 with the shape data SD detected by the shape detection sensor 14 in accordance with the matching algorithm MA.

Figure 16:
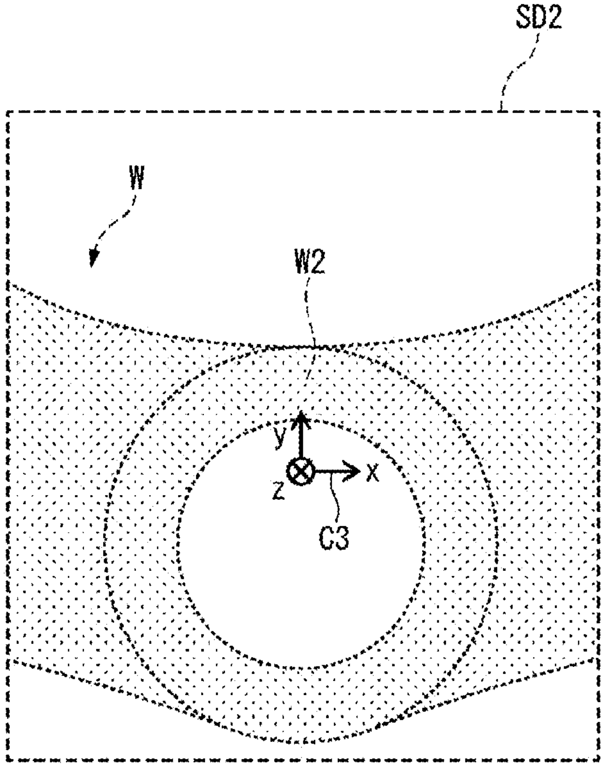
FIG. 16 illustrates another example of shape data of a workpiece detected by the shape detection sensor.
Figure 17:
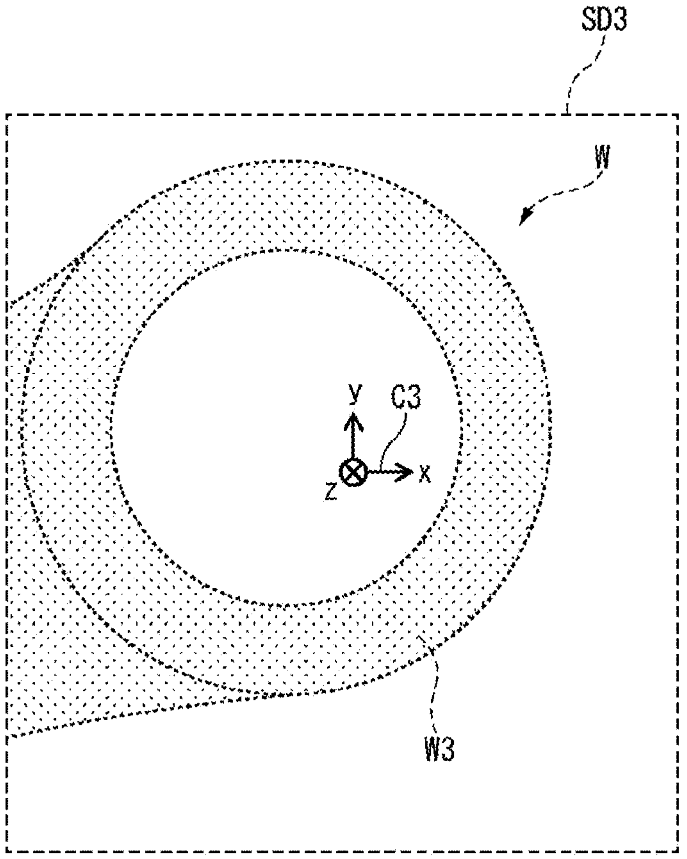
FIG. 17 illustrates still another example of shape data of a workpiece detected by the shape detection sensor.

For example, it is assumed that the shape detection sensor 14 images the workpiece W every time the robot 12 sequentially positions the shape detection sensor 14 at different detection positions DP1, DP2, and DP3, and as a result, detects the shape data SD1 illustrated in FIG. 4, shape data SD2 illustrated in FIG. 16, and shape data SD3 illustrated in FIG. 17.

In this case, the processor 32 sequentially arranges the partial model WM1 (FIG. 6 and FIG. 13), the partial model WM2 (FIG. 10 and FIG. 14), and the partial model WM3 (FIG. 11 and FIG. 15) generated in various orientations as described above in the sensor coordinate system C3 of the shape data SD1 of FIG. 4, and searches for the position of the partial model WM1, WM2, or WM3 at which the partial model WM1, WM2, or WM3 matches the portion of the workpiece W appearing in the shape data SD1 (i.e., the model matching MT).

More specifically, every time the various orientations of the partial model WM1 are arranged in the sensor coordinate system C3 of the shape data SD1, the processor 32 executes the model matching MT between the partial model WM1 and the portion of the workpiece W appearing in the shape data SD1. At this time, as the initial position searching, the processor 32 obtains the coincidence degree $\mu 1_{1}$ between the feature points FPm of the partial model WM1 arranged in the sensor coordinate system C3 and the feature points FPw of the workpiece W appearing in the shape data SD1, and compares the obtained coincidence degree $\mu 1_{1}$ with the first threshold value $\mu 1_{th1}$ set with respect to the partial model WM1, thereby searching for the initial position $P0_1$ of the partial model WM1.

When acquiring the initial position $P0_1$, the processor 32 obtains, as the aligning, the coincidence degree $\mu 1_{2}$ between the point cloud of the partial model WM1 (the point cloud model $WM_P$) arranged in the sensor coordinate system C3 and the three-dimensional point cloud of the shape data SD1, and compares the obtained coincidence degree $\mu 1_{2}$ with the first threshold value $\mu 1_{th2}$, thereby searching for a position where the partial model WM1 arranged in the sensor coordinate system C3 precisely matches the shape data SD1.

Similarly, every time the various orientations of the partial model WM2 are sequentially arranged in the sensor coordinate system C3 of the shape data SD1, the processor 32 executes the model matching MT between the partial model WM2 and the portion of the workpiece W appearing in the shape data SD1. At this time, as the initial position searching, the processor 32 obtains the coincidence degree $\mu 2_{1}$ between the feature points FPm of the partial model WM2 and the feature points FPw of the workpiece W appearing in the shape data SD1, and compares the obtained coincidence degree $\mu 2_{1}$ with the second threshold value $\mu 2_{th1}$ set with respect to the partial model WM2, thereby searching for the initial position $P0_2$ of the partial model WM1.

When acquiring the initial position $P0_2$, the processor 32 obtains, as the aligning, the coincidence degree $\mu 2_{2}$ between the point cloud of the partial model WM2 (the point cloud model $WM_P$) arranged in the sensor coordinate system C3 and the three-dimensional point cloud of the shape data SD1, and compares the obtained coincidence degree $\mu 2_{2}$ with the second threshold value $\mu 2_{th2}$, thereby searching for a position where the partial model WM2 arranged in the sensor coordinate system C3 precisely matches the shape data SD1.

Similarly, every time the various orientations of the partial model WM3 are sequentially arranged in the sensor coordinate system C3 of the shape data SD1, the processor 32 executes the model matching MT between the partial model WM3 and the portion of the workpiece W appearing in the shape data SD1. At this time, as the initial position searching, the processor 32 obtains the coincidence degree $\mu 3_{1}$ between the feature points FPm of the partial model WM3 and the feature points FPw of the workpiece W appearing in the shape data SD1, and compares the obtained coincidence degree $\mu 3_{1}$ with the third threshold value $\mu 3_{th1}$ set with respect to the partial model WM3, thereby searching for the initial position $P0_3$ of the partial model WM1.

When acquiring the initial position $P0_3$, the processor 32 obtains, as the aligning, the coincidence degree $\mu 3_{2}$ between the point cloud of the partial model WM3 (the point cloud model $WM_P$) arranged in the sensor coordinate system C3 and the three-dimensional point cloud of the shape data SD1, and compares the obtained coincidence degree $\mu 3_{2}$ with the third threshold value $\mu 3_{th2}$, thereby searching for a position where the partial model WM3 arranged in the sensor coordinate system C3 precisely matches the shape data SD1.

In this manner, the processor 32 sequentially matches the partial models WM1, WM2, and WM3 with the shape data SD1, and searches for the position of the partial model WM1, WM2, or WM3 where the partial model WM1, WM2, or WM3 coincides with the shape data SD1. As a result of the model matching MT between the shape data SD1 and the partial model WM1, WM2, or WM3, upon determining that the partial model WM1 matches the shape data SD1, the processor 32 sets the workpiece coordinate system C4 with respect to the partial model WM1 arranged in the sensor coordinate system C3 as illustrated in FIG. 7.

Then, the processor 32 acquires the coordinates $P1_S$ in the sensor coordinate system C3 of the set workpiece coordinate system C4, and then transforms the coordinates $P1_S$ into the coordinates $P1_R$ of the robot coordinate system C1, thereby acquiring the position $P1_R$ in the robot coordinate system C1 of the portion (ring W1) of the workpiece W appearing in the shape data SD1.

Similarly, the processor 32 executes the model matching MT on the shape data SD2 illustrated in FIG. 16 with the partial model WM1, WM2, or WM3. As a result, upon determining that the partial model WM2 matches the shape data SD2, the processor 32 sets a workpiece coordinate system C6 with respect to the partial model WM2 arranged in the sensor coordinate system C3 as illustrated in FIG. 18.

Figure 18:
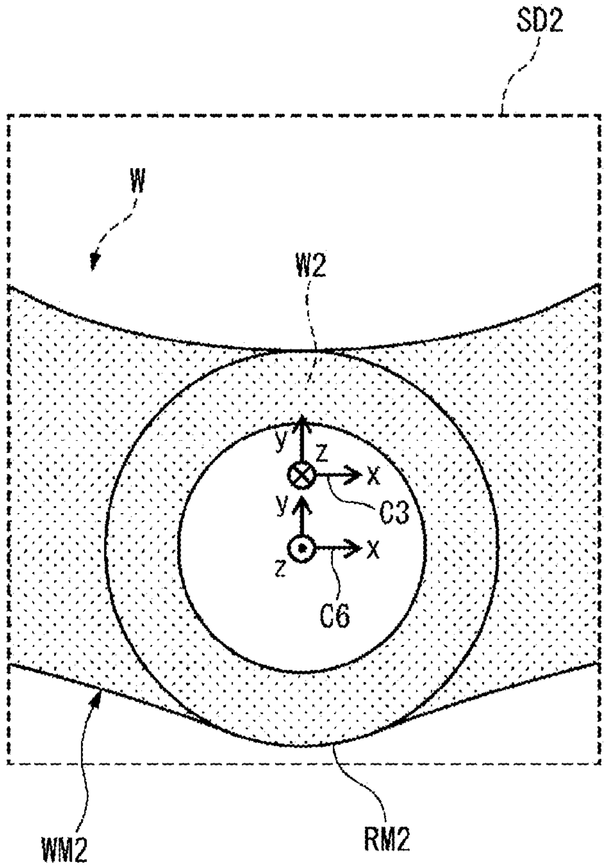
FIG. 18 illustrates a state in which the partial model illustrated in FIG. 10 is matched with the shape data illustrated in FIG. 16.

In the example illustrated in FIG. 18, with respect to the partial model WM2 matched with the shape data SD2, the processor 32 sets, in the sensor coordinate system C3, the workpiece coordinate system C6 such that the origin thereof is arranged at the center of the ring model RM2 and the z axis thereof coincides with the center axis of the ring model RM2. The workpiece coordinate system C6 is the control coordinate system C representing the position of a portion (i.e., a portion including the ring W2) of the workpiece W appearing in the shape data SD2.

Then, the processor 32 acquires the coordinates $P2_S$ in the sensor coordinate system C3 of the set workpiece coordinate system C6, and then transforms the coordinates $P2_S$ into the coordinates $P2_R$ of the robot coordinate system C1, thereby acquiring the position $P2_R$ in the robot coordinate system C1 of the portion (ring W2) of the workpiece W appearing in the shape data SD2.

Similarly, the processor 32 executes the model matching MT on the shape data SD3 illustrated in FIG. 17 with the partial model WM1, WM2, or WM3. As a result, upon determining that the partial model WM3 matches the shape data SD3, the processor 32 sets a workpiece coordinate system C7 with respect to the partial model WM3 arranged in the sensor coordinate system C3 as illustrated in FIG. 19.

Figure 19:
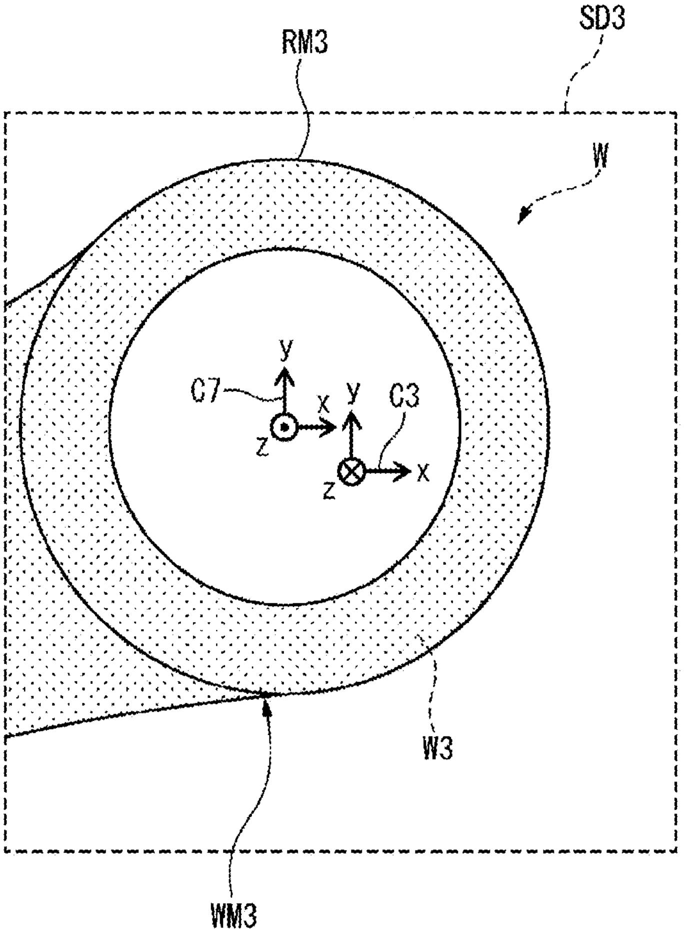
FIG. 19 illustrates a state in which the partial model illustrated in FIG. 11 is matched with the shape data illustrated in FIG. 17.

In the example illustrated in FIG. 19, with respect to the partial model WM3 matched with the shape data SD3, the processor 32 sets, in the sensor coordinate system C3, the workpiece coordinate system C7 such that the origin thereof is arranged at the center of the ring model RM3 and the z axis thereof coincides with the center axis of the ring model RM3. The workpiece coordinate system C7 is the control coordinate system C representing the position of a portion (i.e., a portion including the ring W3) of the workpiece W appearing in the shape data SD3.

Then, the processor 32 acquires the coordinates $P3_S$ in the sensor coordinate system C3 of the set workpiece coordinate system C7, and then transforms the coordinates $P3_S$ into the coordinates $P3_R$ of the robot coordinate system C1, thereby acquiring the position $P3_R$ in the robot coordinate system C1 of the portion (ring W3) of the workpiece W appearing in the shape data SD3.

In this way, the processor 32 functions as the position acquiring unit 48 and respectively matches the partial models WM1, WM2, and WM3 that the processor has generated functioning as the partial model generating unit 46 with the shape data SD1, SD2, and SD3 detected by the shape detection sensor 14, thereby acquiring the positions $P1_S$, $P1_R$, $P2_S$, $P2_R$, $P3_S$, and $P3_R$ (first position) in the control coordinate system C (the sensor coordinate system C3 and the robot coordinate system C1) of the portions W1, W2, and W3 of the workpiece W.

Subsequently, the processor 32 functions as the position acquiring unit 48 to acquire the position $P4_R$ (second position) of the workpiece W in the robot coordinate system C1, based on the acquired positions $P1_R$, $P2_R$, and $P3_R$ in the robot coordinate system C1 and the positions of the partial models WM1, WM2, and WM3 in the workpiece model WM.

Figure 20:
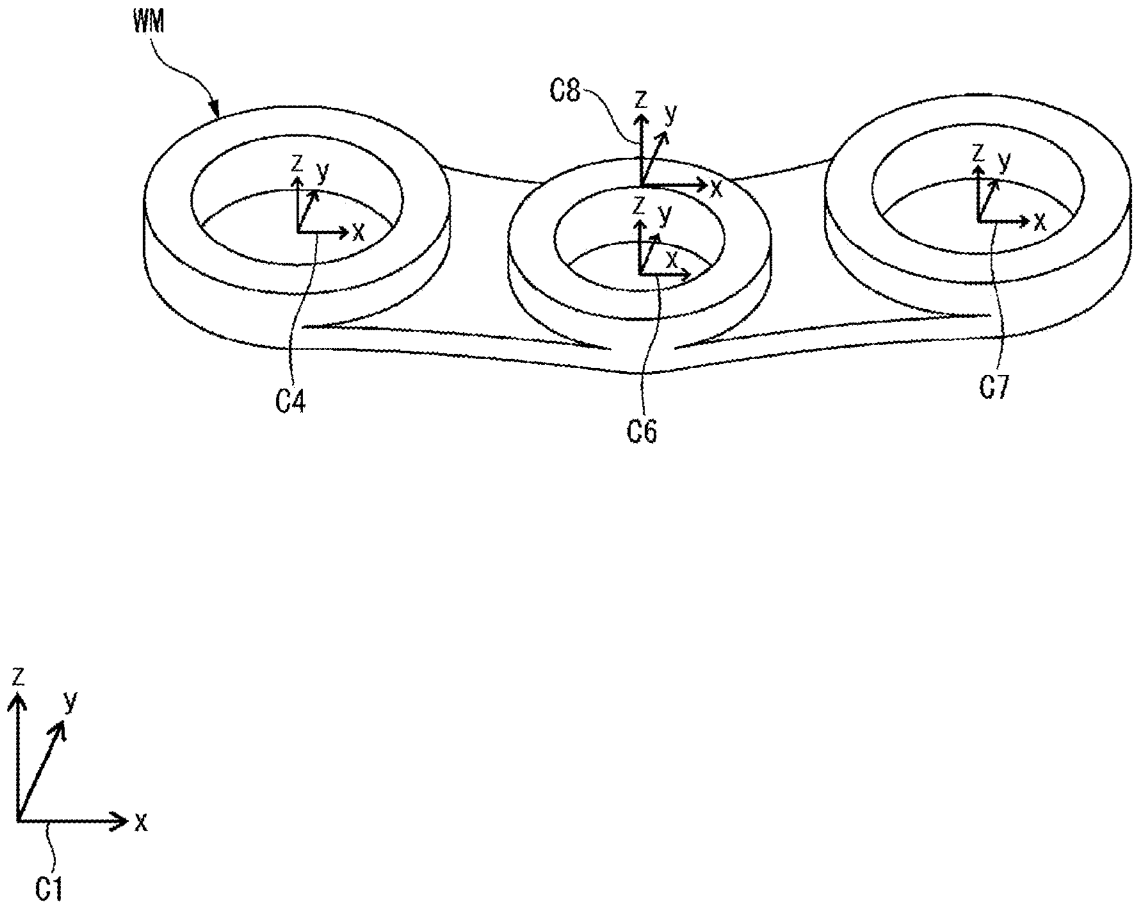
FIG. 20 schematically illustrates workpiece coordinates representing positions of a plurality of portions of the workpiece acquired and a workpiece model defined by the positions.

FIG. 20 schematically illustrates, with respect to the workpiece model WM, the position $P1_R$ (workpiece coordinate system C4), the position $P2_R$ (workpiece coordinate system C6), and the position $P3_R$ (workpiece coordinate system C7) in the robot coordinate system C1 that the processor 32 has acquired functioning as the position acquiring unit 48. Here, in the present embodiment, a reference workpiece coordinate system C8 representing the position of the entire workpiece model WM is set with respect to the workpiece model WM.

This reference workpiece coordinate system C8 is the control coordinate system C that the processor 32 refers to for positioning the end effector 28 when causing the robot 12 to carry out a work on the workpiece W. On the other hand, ideal positions in the workpiece model WM of the partial models WM1, WM2, and WM3 generated by the processor 32 are known. Therefore, the ideal positions (i.e., ideal coordinates of the workpiece coordinate systems C4, C6, and C7 in the reference workpiece coordinate system C8) in the model with respect to the reference workpiece coordinate system C8 of the workpiece coordinate systems C4, C6, and C7 set with respect to the partial models WM1, WM2, and WM3 are known.

Here, the positional relationships of the position $P1_R$ (coordinates in the workpiece coordinate system C4), the position $P2_R$ (coordinates in the workpiece coordinate system C6), and the position $P3_R$ (coordinates in the workpiece coordinate system C7) of the robot coordinate system C1 acquired by the processor 32 functioning as the position acquiring unit 48 may be different from the ideal positions of the workpiece coordinate systems C4, C6, and C7 with respect to the reference workpiece coordinate system C8.

Therefore, in the present embodiment, the processor 32 sets the reference workpiece coordinate system C8 in the robot coordinate system C1, and acquires a position $P1_R'$, a position $P2_R'$, and a position $P3_R'$ in the robot coordinate system C1 of the workpiece coordinate systems C4, C6, and C7 set to the ideal positions with respect to the reference workpiece coordinate system C8.

Subsequently, the processor 32 obtains errors γ1 ($=|P1_R-P1_R'|$ or $(P1_R-P1_R')^2$), γ2 ($=|P2_R-P2_R'|$ or $(P2_R-P2_R')^2$), and γ3 ($=|P3_R-P3_R'|$ or $(P3_R-P3_R')^2$) between the position $P1_R$, the position $P2_R$, and the position $P3_R$ in the robot coordinate system C1 acquired by the processor 32 functioning as the position acquiring unit 48 and the position $P1_R'$, the position $P2_R'$, and the position $P3_R'$ acquired as the ideal positions, and obtains a sum $\Sigma\gamma=(\gamma 1+\gamma 2+\gamma 3)$ of the errors γ1, γ2, and γ3. The processor 32 obtains the sum Σγ every time the reference workpiece coordinate system C8 is repeatedly set in the robot coordinate system C1, and searches for the position $P4_R$ (coordinates) of the reference workpiece coordinate system C8 in the robot coordinate system C1 at which the sum Σγ is at a minimum.

In this way, the processor 32 acquires the position $P4_R$ of the reference workpiece coordinate system C8 in the robot coordinate system C1, based on the positions $P1_R$, $P2_R$, and $P3_R$ in the robot coordinate system C1 acquired by the processor 32 functioning as the position acquiring unit 48 and the positions (i.e., the ideal coordinates) of the workpiece coordinate systems C4, C6, and C7 with respect to the reference workpiece coordinate system C8.

This position $P4_R$ represents a position (second position) in the robot coordinate system C1 of the workpiece W detected as the shape data SD1, SD2, and SD3 by the shape detection sensor 14. Note that the method of obtaining the position $P4_R$ described above is an example, and the processor 32 may obtain the position $P4_R$ using any method.

Subsequently, the processor 32 determines a target position TP (i.e., coordinates of the tool coordinate system C2 set in the robot coordinate system C1) for positioning the end effector 28 when carrying out a work on the workpiece W based on the acquired position $P4_R$. For example, the operator teaches in advance a positional relationship RL of the target position TP with respect to the reference workpiece coordinate system C8 (e.g., coordinates of the target position TP in the reference workpiece coordinate system C8).

In this case, the processor 32 can determine the target position TP in the robot coordinate system C1, based on the position $P4_R$ acquired by the processor 32 functioning as the position acquiring unit 48 and the positional relationship RL taught in advance. The processor 32 generates a command for each of the servo motors 30 of the robot 12 in accordance with the target position TP determined in the robot coordinate system C1, and positions the end effector 28 at the target position TP by the operation of the robot 12, thereby carrying out a work on the workpiece W through the end effector 28.

As described above, in the present embodiment, the processor 32 functions as the model acquiring unit 44, the partial model generating unit 46, the position acquiring unit 48, the range setting unit 52, the first input reception unit 54, the image data generating unit 56, the second input reception unit 58, and the threshold value setting unit 60 to acquire the positions $P1_S$, $P1_R$, $P2_S$, $P2_R$, $P3_S$, $P3_R$, and $P4_R$ of the workpiece W in the control coordinate system C (the robot coordinate system C1 and the sensor coordinate system C3), based on the shape data SD1, SD2, and SD3.

Therefore, the model acquiring unit 44, the partial model generating unit 46, the position acquiring unit 48, the range setting unit 52, the first input reception unit 54, the image data generating unit 56, the second input reception unit 58, and the threshold value setting unit 60 constitute a device 70 (FIG. 8) that acquires the position of the workpiece W based on the shape data SD1, SD2, and SD3.

In this device 70, the partial model generating unit 46 generates the plurality of partial models WM1, WM2, and WM3 obtained by limiting the workpiece model WM to the plurality of parts W1, W2, and W3, respectively. According to this configuration, the position acquiring unit 48 can acquire the positions P1$_R$, P2$_R$, and P3$_R$ in the control coordinate system C (robot coordinate system C1) of the respective portions of the workpiece W, by matching the plurality of partial models WM1, WM2, and WM3 with the shape data SD1, SD2, and SD3 in which the shape detection sensor 14 detects the plurality of portions of the workpiece W.

In the device 70, the partial model generating unit 46 divides the entire workpiece model WM into the plurality of parts, thereby generating the plurality of partial models WM1, WM2, and WM3 obtained by limiting the workpiece model WM to the plurality of parts, respectively. According to this configuration, the position acquiring unit 48 can obtain the positions P1$_R$, P2$_R$, and P3$_R$ of the portions constituting the entire workpiece W.

The device 70 includes the threshold value setting unit 60 that individually sets the threshold values $\mu 1_{th}$, $\mu 2_{th}$, and $\mu 3_{th}$ with respect to the plurality of partial models WM1, WM2, and WM3, respectively. Then, the position acquiring unit 48 obtains the coincidence degrees μ1, μ2, and μ3 between the partial models WM1, WM2, and WM3 and the shape data SD1, SD2, and SD3, respectively, and compares the obtained coincidence degrees μ1, μ2, and μ3 with the predetermined threshold values $\mu 1_{th}$, $\mu 2_{th}$, and $\mu 3_{th}$, respectively, thereby determining whether or not the partial models WM1, WM2, and WM3 match the shape data SD1, SD2, and SD3.

According to this configuration, the coincidence degrees μ1, μ2, and μ3 required in the above-described model matching MT can be freely set in consideration of various conditions such as the feature points FPm of the individual partial models WM1, WM2, and WM3. Therefore, the processing of the model matching MT can be more flexibly designed.

The device 70 further includes the range setting unit 52 that sets the limit ranges RR1, RR2, and RR3 with respect to the workpiece model WM. The partial model generating unit 46 generates the partial models WM1, WM2, and WM3 by limiting the workpiece model WM in accordance with the limit ranges RR1, RR2, and RR3 set by the range setting unit 52. According to this configuration, it is possible to determine which part of the workpiece model WM to limit in order to generate the partial models WM1, WM2, and WM3.

In the device 70, the range setting unit 52 sets the limit ranges RR1, RR2, and RR3 based on the detection range DR in which the shape detection sensor 14 detects the workpiece W. According to this configuration, the partial model generating unit 46 can generate the partial models WM1, WM2, and WM3 that highly correlate (specifically, substantially coincide) with the shape data SD1, SD2, and SD3 of the portions of the workpiece W detected by the shape detection sensor 14.

When the model matching MT is performed on the partial models WM1, WM2, and WM3 with the shape data SD1, SD2, and SD3, the partial models WM1, WM2, and WM3 fit in the maximum size of the shape data SD1, SD2, and SD3. As a result, the model matching MT can be executed with higher accuracy.

The device 70 further includes the first input reception unit 54 that receives the input IP1 for defining the limit ranges RR1, RR2, and RR3, and the range setting unit 52 sets the limit ranges RR1, RR2, and RR3 in response to the input IP1 received by the first input reception unit 54. According to this configuration, the operator freely sets the limit ranges RR1, RR2, and RR3, whereby the workpiece model WM can be limited to the freely-selected partial models WM1, WM2, and WM3.

In the device 70, the range setting unit 52 sets a first limit range (e.g., the limit range RR1) for limiting to a first part (e.g., a part of the ring model RM1) and a second limit range (e.g., the limit range RR2) for limiting to a second part (e.g., a part of the ring model RM2), with respect to the workpiece model WM.

Then, the partial model generating unit 46 generates the first partial model WM1 by limiting the workpiece model WM to the first part RM1 in accordance with the first limit range RR1, and generates the second partial model WM2 by limiting the workpiece model WM2 to the second part RM2 in accordance with the second limit range RR2. According to this configuration, the partial model generating unit 46 can generate the plurality of partial models WM1 and WM2 in accordance with the plurality of limit ranges RR1 and RR2, respectively.

In the device 70, the range setting unit 52 sets the first limit range and the second limit range (e.g., the limit ranges RR1 and RR2 or the limit ranges RR2 and RR3) such that the boundaries B1 or B2 coincide with each other. According to this configuration, for example, as illustrated in FIGS. 6, 10, and 11, the workpiece model WM can be divided into the partial models WM1, WM2, and WM3 without surplus or omission.

In the device 70, the position acquiring unit 48 acquires the second position PAR of the workpiece W in the robot coordinate system C1, based on the acquired first positions P1$_R$, P2$_R$, and P3$_R$ and the positions (specifically, the ideal positions of the workpiece coordinate systems C4, C6, and C7 with respect to the reference workpiece coordinate system C8 are) of the partial models WM1, WM2, and WM3 in the workpiece model WM.

More specifically, by matching the plurality of partial models WM1, WM2, and WM3 with the shape data SD1, SD2, and SD3, respectively, the position acquiring unit 48 acquires the first positions P1$_R$, P2$_R$, and P3$_R$ in the control coordinate system C of the plurality of portions W1, W2, and W3 respectively corresponding to the plurality of partial models WM1, WM2, and WM3, and acquires the second position P4$_R$, based on the acquired first positions P1$_R$, P2$_R$, and P3$_R$. According to this configuration, the position P4$_R$ of the entire workpiece W can be obtained with high accuracy by acquiring the positions P1$_R$, P2$_R$, and P3$_R$ of the respective portions W1, W2, and W3 of the relatively large workpiece W.

The device 70 includes the image data generating unit 56 that generates the image data ID1, ID2, and ID3 of the partial models WM1, WM2, and WM3, and the second input reception unit 58 that receives the input IP2 that permits the position acquiring unit 48 to use the partial models WM1, WM2, and WM3 for the model matching MT through the image data ID1, ID2, and ID3. According to this configuration, by visually recognizing the image data ID1, ID2, and ID3, after confirming whether or not the partial models WM1, WM2, and WM3 are appropriately generated, the operator can determine whether or not to permit use of the partial models WM1, WM2, and WM3.

Figure 21:
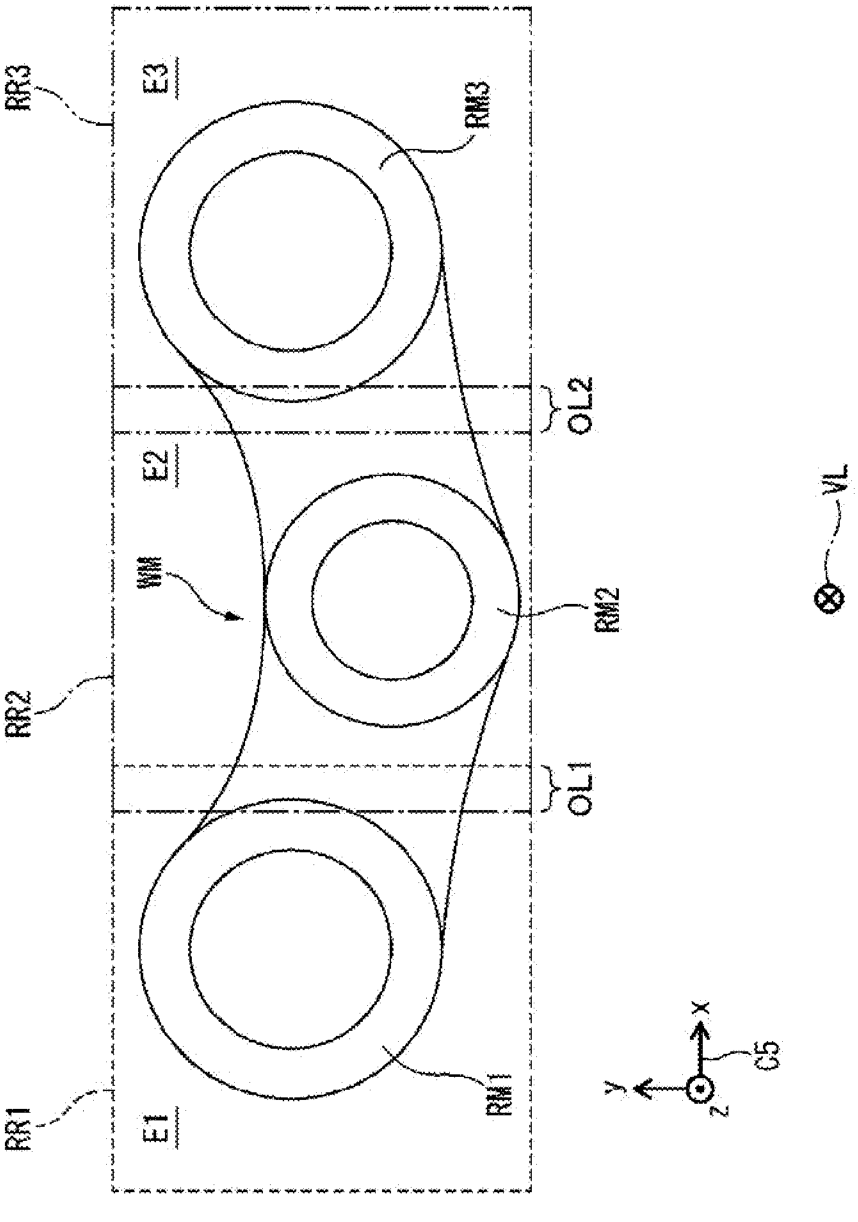
FIG. 21 illustrates still another example of a limit range set in a workpiece model.

Note that the range setting unit 52 may set the limit range RR1 and the limit range RR2, or the limit range RR2 and the limit range RR3 so as to partially overlap each other. Such a form is illustrated in FIG. 21. In the example illustrated in FIG. 21, the limit range RR1 indicated by the dotted line region and the limit range RR2 indicated by the single dot-dash line region are set in the model coordinate system C5 so as to overlap each other in an overlap region OL1, and the limit range RR2 and the limit range RR3 indicated by the double dot-dash line region are set in the model coordinate system C5 so as to overlap each other in an overlap region OL2.

The processor 32 may function as the range setting unit 52, and automatically set the limit ranges RR1, RR2, and RR3 so as to overlap each other as illustrated in FIG. 21 based on the detection range DR of the shape detection sensor 14. In this case, the processor 32 may receive an input IP4 for determining the areas of the overlap regions OL1 and OL2.

For example, it is assumed that, in order to set the limit ranges RR1, RR2, and RR3 to the workpiece model WM in a state viewed from the front as illustrated in FIG. 21, the operator gives the processor 32 the input IP4 in which the areas of the overlap regions OL1 and OL2 are β[%] of the areas E1, E2, and E3 of the limit ranges RR1, RR2, and RR3.

In this case, similarly to the embodiments described above, the processor 32 determines the areas E1, E2, and E3 based on the detection range DR, determines the overlap region OL1 so that the limit ranges RR1 and RR2 overlap by β[%] of the areas E1 and E2, respectively, and determines the overlap region OL2 so that the limit ranges RR2 and RR3 overlap by β[%] of the areas E2 and E3, respectively. In this way, as illustrated in FIG. 21, the processor 32 can automatically set, in the model coordinate system C5, the limit ranges RR1, RR2, and RR3 that overlap each other in the overlap regions OL1 and OL2 and in which the workpiece model WM viewed from the front fits therein.

Alternatively, the processor 32 may set the limit ranges RR1, RR2, and RR3 overlapping each other as illustrated in FIG. 21 in accordance with the input IP1 (input of coordinates of each vertex of the limit ranges RR1, RR2, and RR3, input of the areas E1, E2, and E3, or input of dragging and dropping of the boundaries of the limit ranges RR1, RR2, and RR3) received from the operator through the input device 42.

Then, the processor 32 functions as the partial model generating unit 46 to limit the workpiece model WM in accordance with the limit ranges RR1, RR2, and RR3 set as illustrated in FIG. 21, and generates the partial model WM1 limited by the limit range RR1, the partial model WM2 limited by the limit range RR2, and the partial model WM3 limited by the limit range RR3.

As in the present embodiment, the range setting unit 52 can more variously set the limit ranges RR1, RR2, and RR3 in accordance with various conditions with the limit regions RR1, RR2, and RR3 made settable so as to partially overlap each other. Due to this, the partial model generating unit 46 can generate the partial models WM1, WM2, and WM3 in more various forms.

Figure 22:
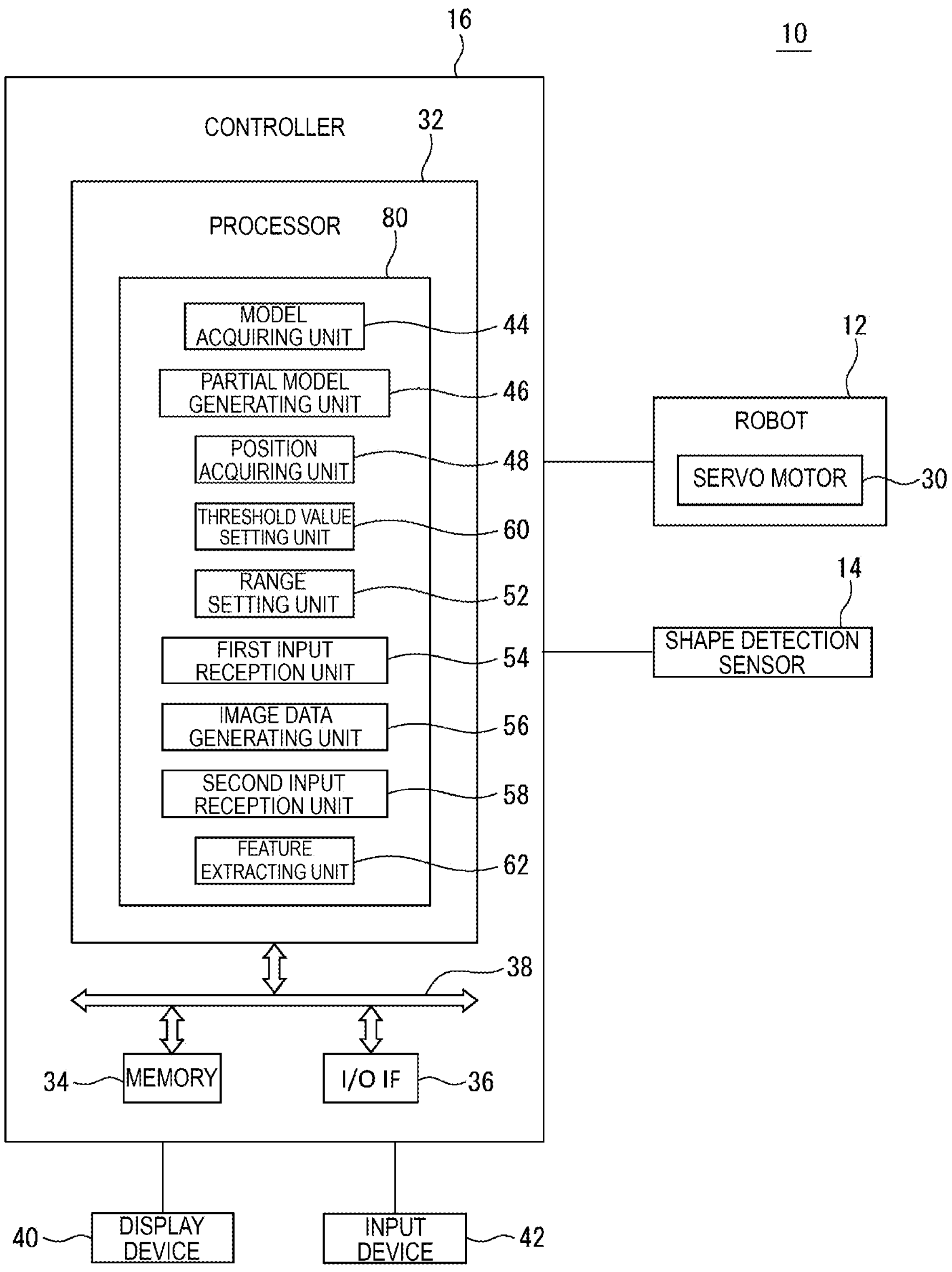
FIG. 22 is a block diagram of a robot system according to still another embodiment.
Figure 23:
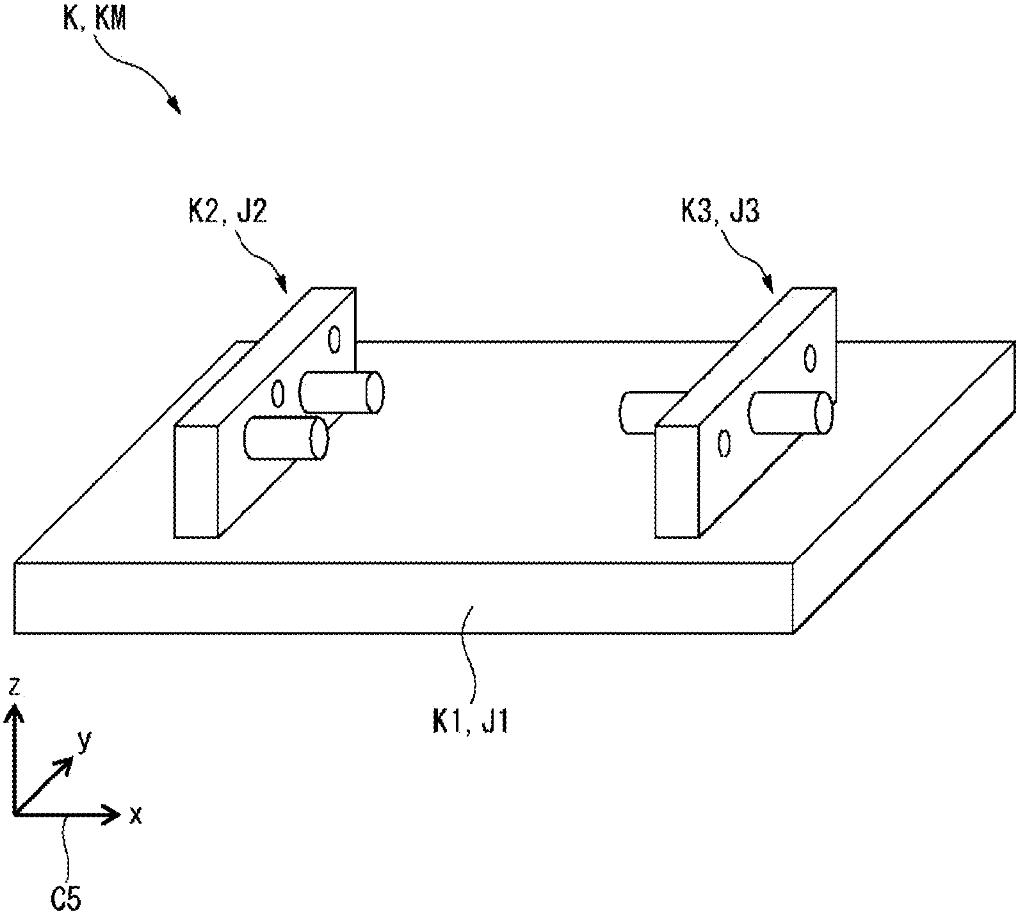
FIG. 23 illustrates another example of a workpiece and a workpiece model modeling the workpiece.

Subsequently, still another function of the robot system 10 will be described with reference to FIG. 22. In the present embodiment, the processor 32 acquires the position of a workpiece K in order to carry out a work on the workpiece K illustrated in FIG. 23. In the example illustrated in FIG. 23, the workpiece K includes a base plate K1 and a plurality of structures K2 and K3 provided on the base plate K1. Each of the structures K2 and K3 has a relatively complex structure including walls, holes, grooves, protrusions, and the like made of a plurality of surfaces and edges.

First, similarly to the embodiments described above, the processor 32 functions as the model acquiring unit 44 to acquire a workpiece model KM modeling the workpiece K. Note that in the processor 32 may acquire the workpiece model KM as model data of a CAD model $KM_C$ (three-dimensional CAD) of the workpiece K or a point cloud model $KM_P$ representing a model component of the CAD model $KM_C$ as a point cloud.

Subsequently, the processor 32 extracts feature points FPn of the workpiece model KM. In the present embodiment, the workpiece model KM includes a base plate model J1 and structure models J2 and J3 modeling the base plate K1 and the structures K2 and K3 of the workpiece K, respectively. The structure models J2 and J3 include many feature points FPn that are relatively complex and easily extracted, with image processing, by a computer, such as walls, holes, grooves, and protrusions described above, and on the other hand, the base plate model J1 includes relatively few such feature points FPn.

The processor 32 performs image analysis on the workpiece model KM in accordance with a predetermined image analysis algorithm, and extracts a plurality of feature points FPn included in the workpiece model KM. These feature points FPn are used in the model matching MT executed by the position acquiring unit 48. In this manner, in the present embodiment, the processor 32 functions as the feature extracting unit 62 (FIG. 22) that extracts the feature points FPn of the workpiece model KM used for the model matching MT by the position acquiring unit 48. As described above, in the workpiece model KM, since the structure models J2 and J3 have relatively complex structures, the processor 32 extracts a larger number of feature points FPn regarding the structure models J2 and J3.

Subsequently, the processor 32 functions as the range setting unit 52 to set the limit range RR for limiting the workpiece model KM to a part thereof, with respect to the workpiece model KM that the processor 32 has acquired functioning as the model acquiring unit 44. Here, in the present embodiment, the processor 32 automatically sets the limit range RR based on a number N of the feature points FPn extracted as the feature extracting unit 62.

Specifically, the processor 32 sets the model coordinate system C5 with respect to the workpiece model KM, and specifies a part of the workpiece model KM in which the number N of the extracted feature points FPn is equal to or greater than a predetermined threshold value $N_{th}$ ($N \geq N_{th}$). Then, the processor 32 sets the limit ranges RR4 and RR5 in the model coordinate system C5 so as to contain the specified part of the workpiece model KM.

Figure 24:
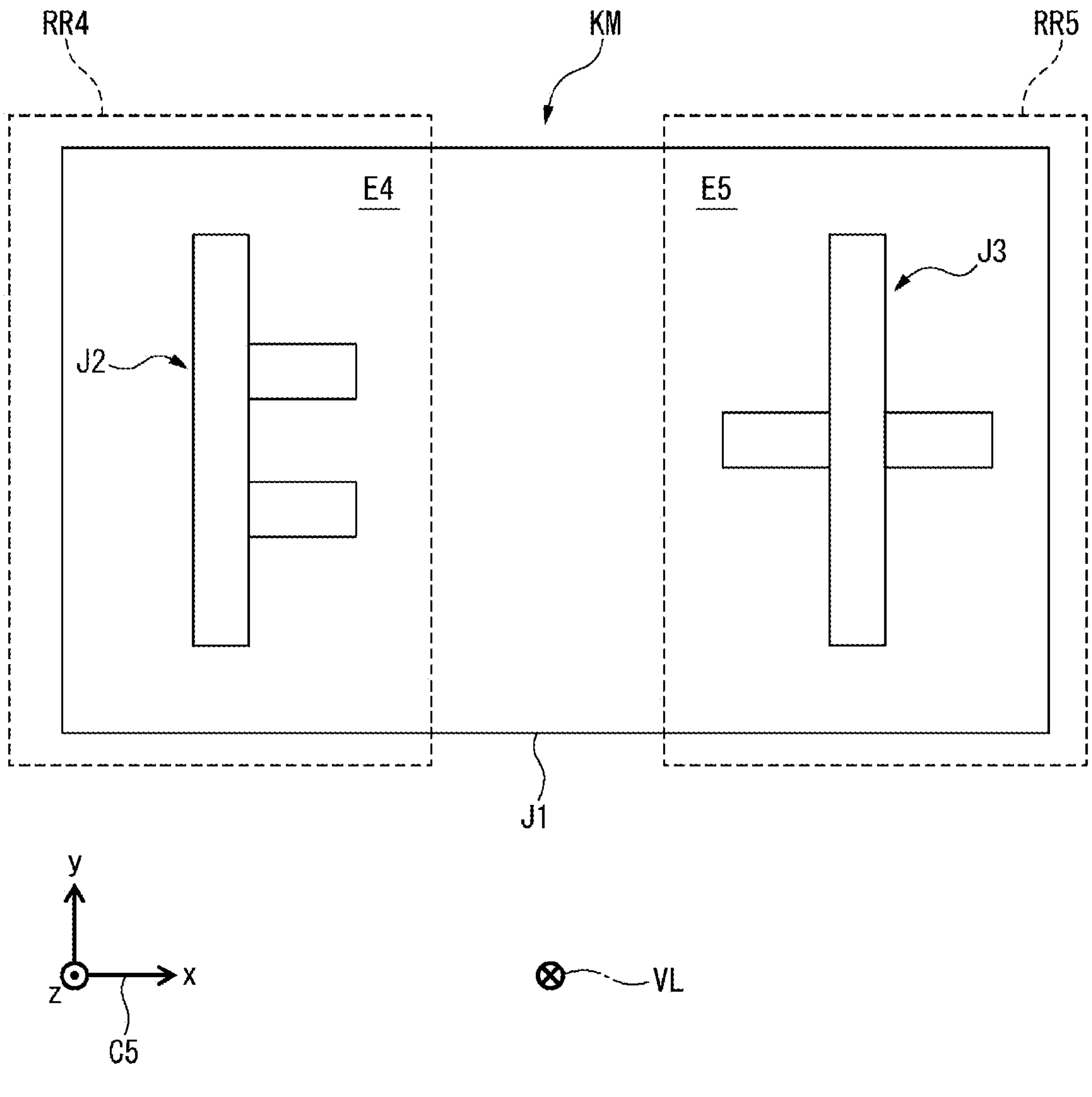
FIG. 24 illustrates an example of a limit region set in the workpiece model illustrated in FIG. 23.

An example of the limit ranges RR4 and RR5 is illustrated in FIG. 24. Note that in the following description, the direction of the workpiece model KM illustrated in FIG. 24 is "front". In a case where the workpiece model KM is viewed from the front as illustrated in FIG. 24, the virtual visual-line direction VL in which the workpiece model KM is viewed is parallel to the z axis direction of the model coordinate system C5.

The processor 32 determines that the number N of the feature points FPn in the part including the structure model J2 and the number N of the feature points FPn in the part including the structure model J3 in the workpiece model KM are equal to or greater than the threshold value $N_{th}$. Therefore, the processor 32 functions as the range setting unit 52 to automatically set the limit range RR4 containing the part including the structure model J2 and the limit range RR5 containing the part including the structure model J3, with respect to the workpiece model KM in the state viewed from the front as illustrated in FIG. 24.

On the other hand, the processor 32 does not set the limit range RR with respect to the part (in the present embodiment, the center part of the base plate model J1) of the workpiece model KM in which the number of feature points FPn is smaller than the threshold value $N_{th}$. As a result, in the present embodiment, the processor 32 sets the limit ranges RR4 and RR5 so as to be separated from each other.

Figure 25:
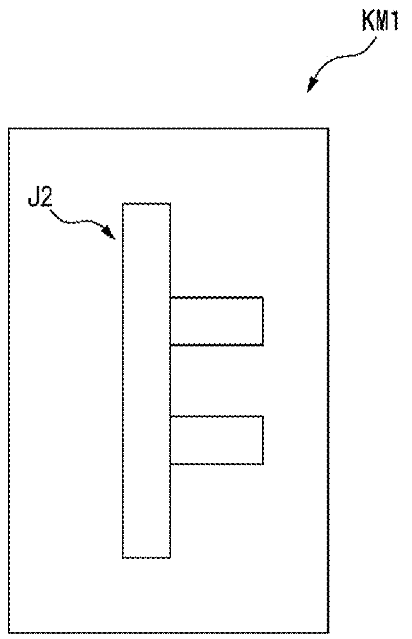
FIG. 25 illustrates an example of a partial model generated in accordance with the limit region illustrated in FIG. 24.
Figure 26:
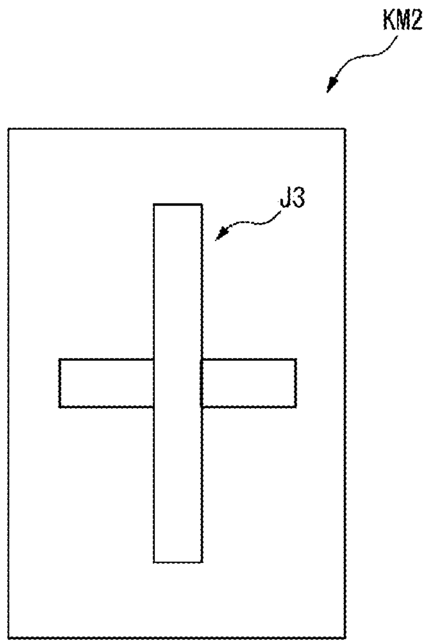
FIG. 26 illustrates an example of a partial model generated in accordance with the limit region illustrated in FIG. 24.

Subsequently, the processor 32 functions as the partial model generating unit 46 to limit the workpiece model KM in accordance with the set limit ranges RR4 and RR5 similarly to the embodiments described above, thereby generating the partial model KM1 (FIG. 25) and the partial model KM2 (FIG. 26) as data different from the workpiece model KM.

In this way, the processor 32 generates the partial model KM1 obtained by limiting the workpiece model KM to a first part (a part including the structure model J2) and the partial model KM2 obtained by limiting the workpiece model KM to a second part (a part including the structure model J3) separated from the first part. Each of the partial models KM1 and KM2 generated in this manner includes the number N ($\geq N_{th}$) of the feature points FPn extracted by the processor 32 functioning as the feature extracting unit 62.

Figure 27:
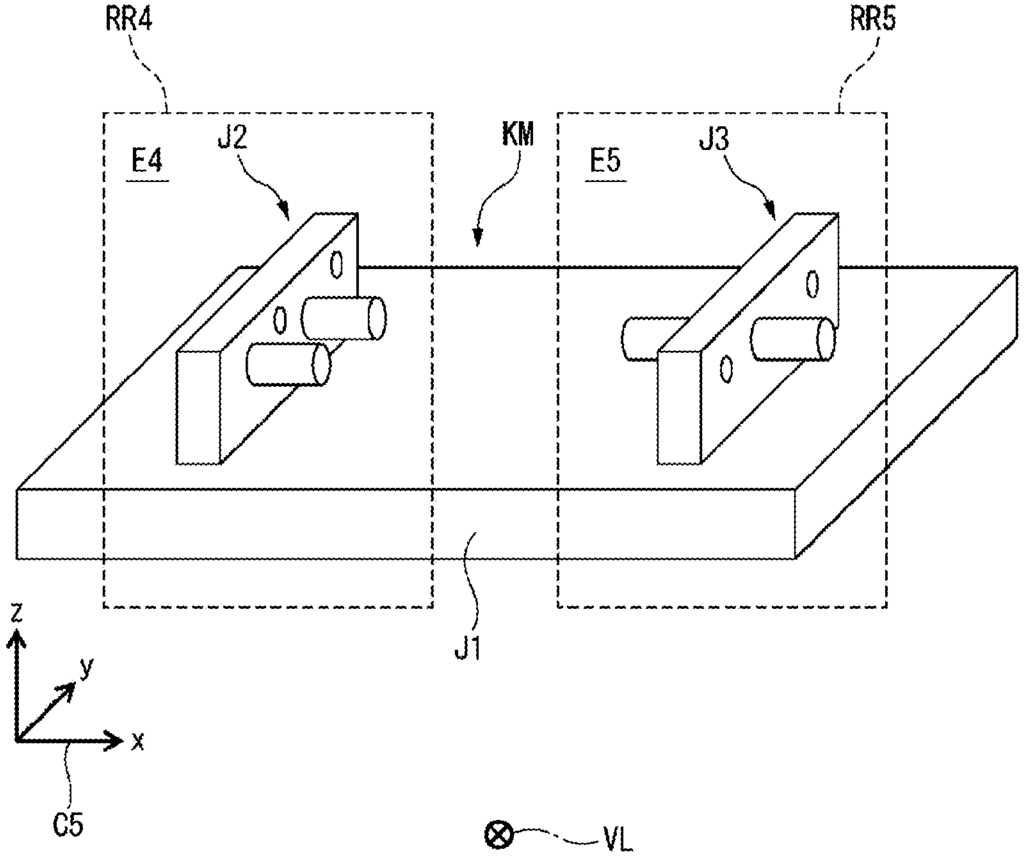
FIG. 27 illustrates another example of the limit region set in the workpiece model illustrated in FIG. 23.

The processor 32 again sets the limit ranges RR4 and RR5 in a state where the orientation of the workpiece model KM viewed from the front illustrated in FIG. 24 is changed. Such an example is illustrated in FIG. 27. In the example illustrated in FIG. 27, by pivoting, with respect to the virtual visual-line direction VL, the direction of the workpiece model KM from the state in which the front of the workpiece model KM is illustrated in FIG. 24, the orientation of the workpiece model KM is changed to an orientation in which the workpiece model KM is illustrated in a perspective view.

The processor 32 functions as the range setting unit 52, and automatically sets the limit ranges RR4 and RR5 in the model coordinate system C4 so as to contain the part (i.e., the structure models J2 and J3) of the workpiece model KM satisfying $N \geq N_{th}$ by the above-described method with respect to the workpiece model KM whose orientation is changed in this manner.

Note that when setting the limit ranges RR4 and RR5 in the model coordinate system C5, the processor 32 may set the area E4 of the limit range RR4 and the area E5 of the limit range RR5 to be limited to equal to or less than the area E of the detection range DR based on the detection range DR of the shape detection sensor 14.

Figure 28:
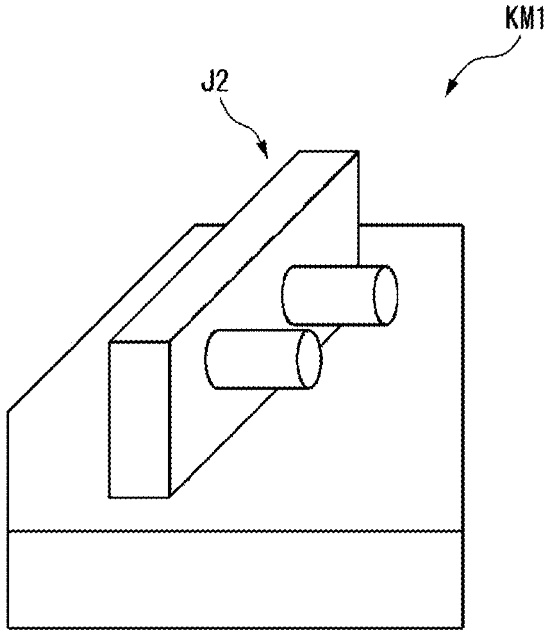
FIG. 28 illustrates an example of a partial model generated in accordance with the limit region illustrated in FIG. 27.
Figure 29:
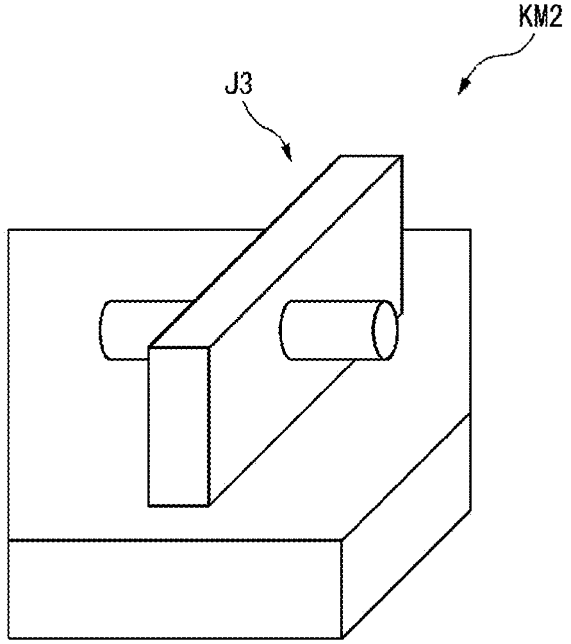
FIG. 29 illustrates an example of a partial model generated in accordance with the limit region illustrated in FIG. 27.

Then, the processor 32 functions as the partial model generating unit 46 to limit the workpiece model KM in accordance with the set limit ranges RR4 and RR5, thereby generating the partial model KM1 (FIG. 28) and the partial model KM2 (FIG. 29) as data different from the workpiece model KM.

In this way, the processor 32 sets the limit ranges RR4 and RR5 respectively to the workpiece model KM arranged at the plurality of orientations, and limits the workpiece models KM in accordance with the limit ranges RR4 and RR5, thereby generating the partial models KM1 and KM2 limited at the plurality of orientations. The processor 32 stores the generated partial models KM1 and KM2 in the memory 34.

Subsequently, similarly to the device 70 described above, the processor 32 functions as the image data generating unit 56 to generate and display, on the display device 40, image data ID4 of the generated partial model KM1 and image data ID5 of the generated partial model KM2. Subsequently, the processor 32 functions as the second input reception unit 58 to receive the input IP2 that permits use of the partial models KM1 and KM3, similarly to the above-described device 70.

Note that in a case where the processor 32 does not receive the input IP2 (alternatively, receives the input IP2' that does not permit use of the partial models KM1 and KM2), the operator may operate the input device 42 to give the processor 32 the input IP1 for manually defining (specifically, changing, canceling, or adding) the limit ranges RR4 and RR5 in the model coordinate system C5. In this case, the processor 32 may function as the first input reception unit 54 to receive the input IP1, and may function as the range setting unit 52 to again set the limit ranges RR4 and RR5 in the model coordinate system C5 in accordance with the received input IP1.

Upon receiving the input IP2 that permits use of the partial models KM1 and KM2, the processor 32 functions as the threshold value setting unit 60 to individually set threshold values $\mu 4_{th}$ and $\mu 5_{th}$ of the coincidence degree u used in the model matching MT with respect to the generated plurality of partial models KM1 and KM2, respectively, similarly to the above-described device 70.

Subsequently, similarly to the embodiments described above, the processor 32 functions as the position acquiring unit 48 to execute the model matching MT of matching the partial models KM1 and KM2 with the shape data SD detected by the shape detection sensor 14 in accordance with the matching algorithm MA. For example, it is assumed that the shape detection sensor 14 images the workpiece K from different detection positions DP4 and DP5 and detects shape data SD4 illustrated in FIG. 30 and shape data SD5 illustrated in FIG. 31.

Figure 30:
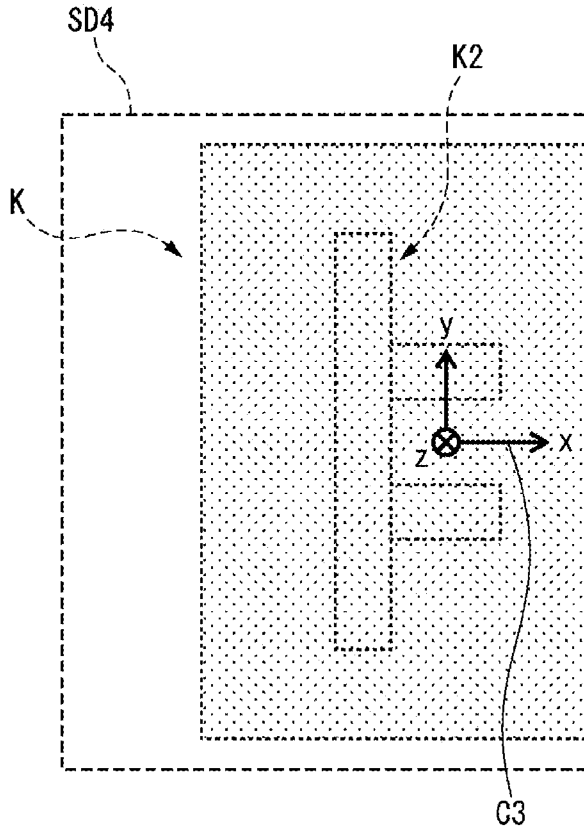
FIG. 30 illustrates an example of shape data of a workpiece detected by the shape detection sensor.

In this case, the processor 32 sequentially arranges the partial model KM1 (FIG. 25 and FIG. 28) and the partial model KM2 (FIG. 26 and FIG. 29) generated in various orientations as described above in the sensor coordinate system C3 of the shape data SD4 of FIG. 30, and searches for the position of the partial model KM1 or KM2 at which the plurality of feature points FPn of the partial model KM1 or KM2 and a plurality of feature points FPk of the workpiece K appearing in the shape data SD4 coincide with each other.

Specifically, similarly to the above-described device 70, every time the various orientations of the partial model KM1 are arranged, the processor 32 determines whether or not the partial model KM1 matches the shape data SD4 by obtaining a coincidence degree $\mu 4$ (specifically, a coincidence degree $\mu 4_{\_1}$ between the feature points FPm of the partial model KM1 and the feature points $FP_W$ of the shape data SD4, and a coincidence degree $\mu 4_{\_2}$ between the point cloud of the point cloud model $WM_P$ of the partial model KM1 and the three-dimensional point cloud of the shape data SD4) between the partial model KM1 and the workpiece K appearing in the shape data SD4, and comparing the coincidence degree $\mu 4$ with the threshold value $\mu 4_{th}$ (specifically, a threshold value $\mu 4_{th1}$ related to the coincidence degree $\mu 4_{\_1}$ and a threshold value $\mu 4_{th2}$ related to the coincidence degree $\mu 4_{\_2}$) set with respect to the partial model KM1.

Every time the various orientations of the partial model KM2 are arranged, the processor 32 determines whether or not the partial model KM2 matches the shape data SD4 by obtaining a coincidence degree $\mu 5$ (specifically, a coincidence degree $\mu 5_{\_1}$ between the feature points FPm of the partial model KM2 and the feature points $FP_W$ of the shape data SD4, and the coincidence degree $\mu 5_{\_2}$ between the point cloud of the point cloud model $WM_P$ of the partial model KM2 and the three-dimensional point cloud of the shape data SD4) between the partial model KM2 and the workpiece K appearing in the shape data SD4, and comparing the coincidence degree $\mu 5$ with the threshold value $\mu 5_{th}$ (specifically, a threshold value $\mu 5_{th1}$ related to the coincidence degree $\mu 5_{\_1}$ and a threshold value $\mu 5_{th2}$ related to the coincidence degree $\mu 5_{\_2}$) set with respect to the partial model KM2.

Figure 32:
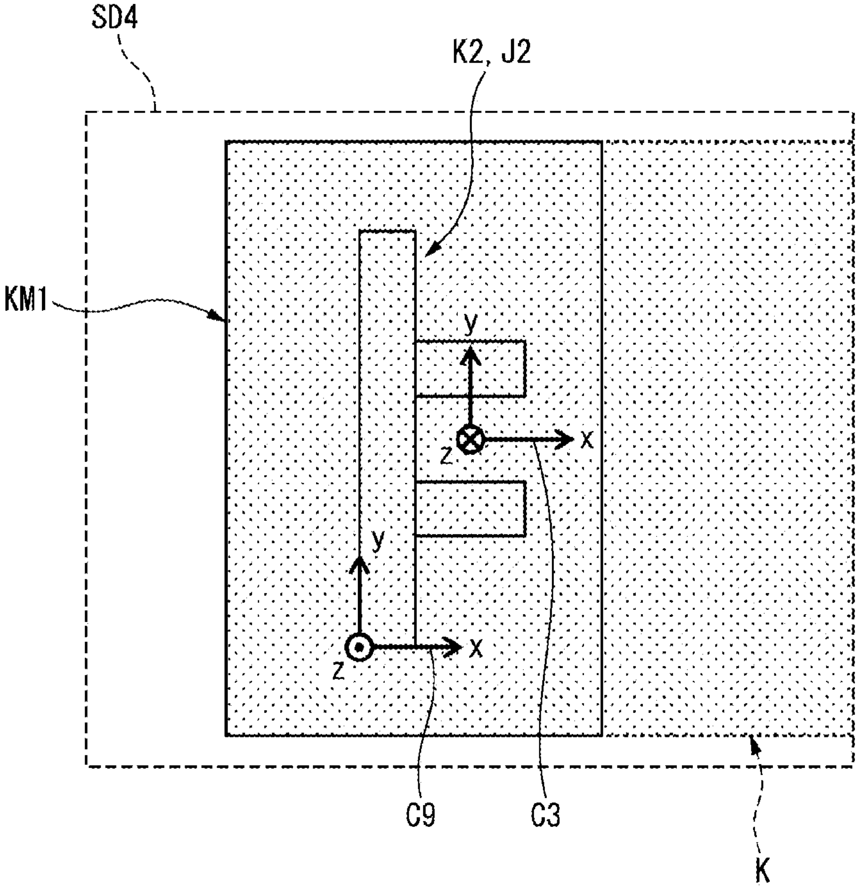
FIG. 32 illustrates a state in which the partial model illustrated in FIG. 25 is matched with the shape data illustrated in FIG. 30.

FIG. 32 illustrates a state in which the partial model KM1 and the shape data SD4 match as a result of the model matching MT. When matching the partial model KM1 and the shape data SD4, the processor 32 sets a workpiece coordinate system C9 with respect to the partial model KM1 arranged in the sensor coordinate system C3 as illustrated in FIG. 32. The workpiece coordinate system C9 is the control coordinate system C representing the position of a portion (i.e., a portion including the structure K2) of the workpiece K appearing in the shape data SD4.

Then, the processor 32 acquires the coordinates $P5_S$ in the sensor coordinate system C3 of the set workpiece coordinate system C9, and then transforms the coordinates $P5_S$ into the coordinates $P5_R$ of the robot coordinate system C1, thereby acquiring the position PER in the robot coordinate system C1 of the portion (structure K2) of the workpiece K appearing in the shape data SD4.

Figure 31:
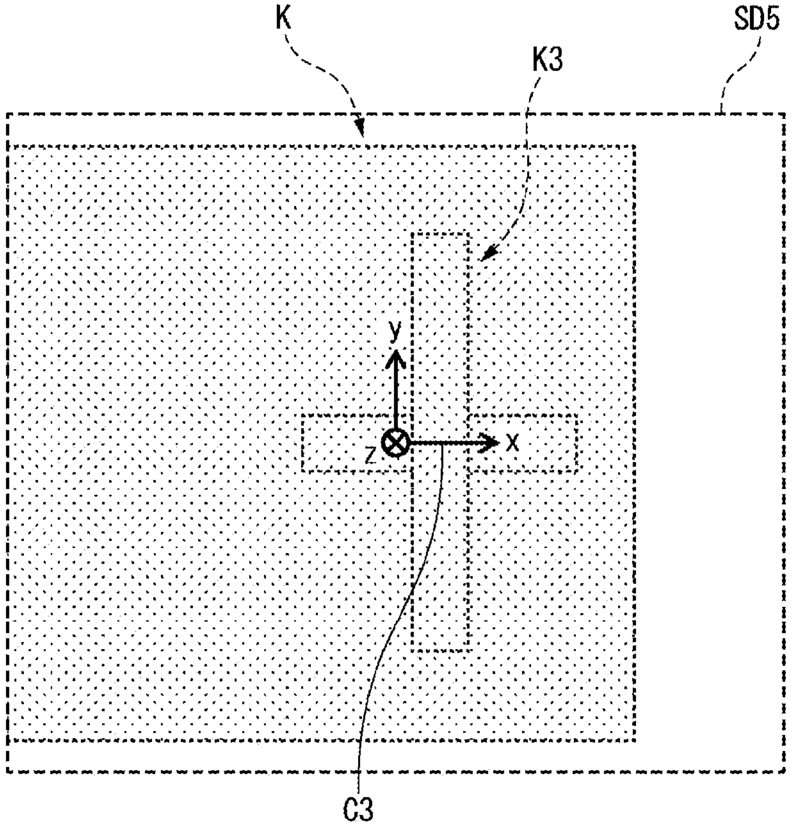
FIG. 31 illustrates another example of shape data of a workpiece detected by the shape detection sensor.
Figure 33:
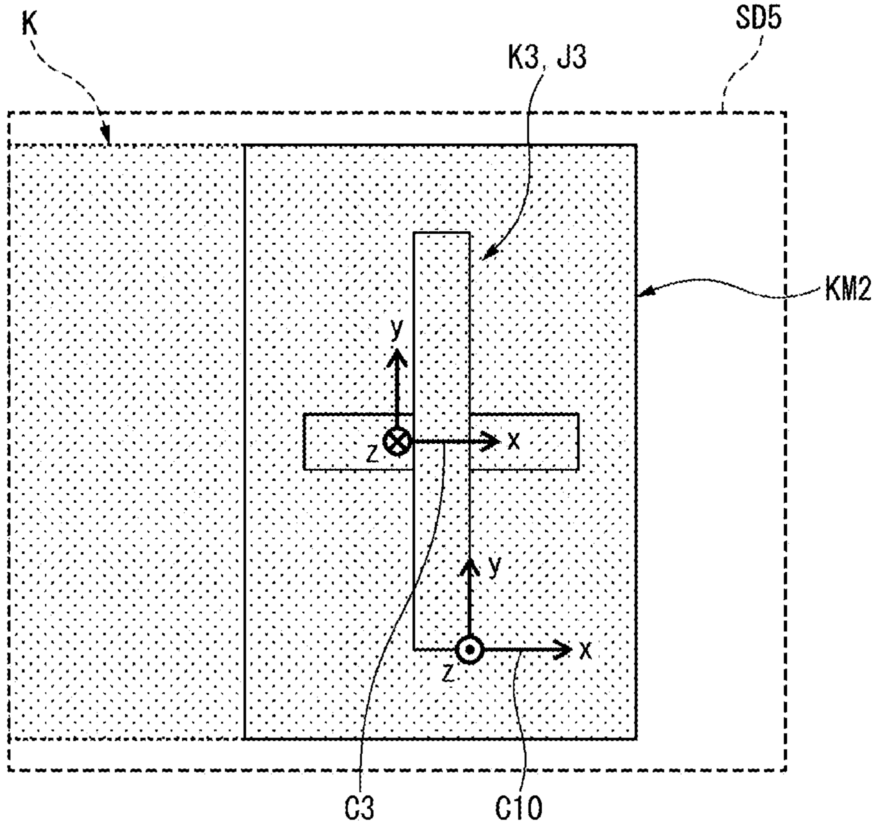
FIG. 33 illustrates a state in which the partial model illustrated in FIG. 26 is matched with the shape data illustrated in FIG. 31.

Similarly, the processor 32 executes the model matching MT on the shape data SD5 illustrated in FIG. 31 with the partial model KM1 or KM2. As a result, upon determining that the partial model WM2 matches the shape data SD5, the processor 32 sets a workpiece coordinate system C10 with respect to the partial model KM2 arranged in the sensor coordinate system C3 as illustrated in FIG. 33. The workpiece coordinate system C10 is the control coordinate system C representing the position of a portion (i.e., a portion including the structure J3) of the workpiece K appearing in the shape data SD5.

Then, the processor 32 acquires the coordinates $P6_S$ in the sensor coordinate system C3 of the set workpiece coordinate system C10, and then transforms the coordinates $P6_S$ into the coordinates $P6_R$ of the robot coordinate system C1, thereby acquiring the position $P6_R$ in the robot coordinate system C1 of the portion (structure K3) of the workpiece K appearing in the shape data SD5.

In this way, the processor 32 functions as the position acquiring unit 48 and respectively matches the partial models KM1 and KM2 with the shape data SD4 and SD5 detected by the shape detection sensor 14, thereby acquiring the positions $P5_S$, $P5_R$, $P6_S$, and $P6_R$ (first position) in the control coordinate system C (the sensor coordinate system C3 and the robot coordinate system C1) of the portions K2 and K3 of the workpiece K.

Subsequently, similarly to the device 70 described above, the processor 32 functions as the position acquiring unit 48 to acquire a position $P7_R$ (second position) of the workpiece K in the robot coordinate system C1, based on the acquired positions $P5_R$ and $P6_R$ of the robot coordinate system C1 and the positions (specifically, ideal positions) of the partial models KM1 and KM2 in the workpiece model KM.

Figure 34:
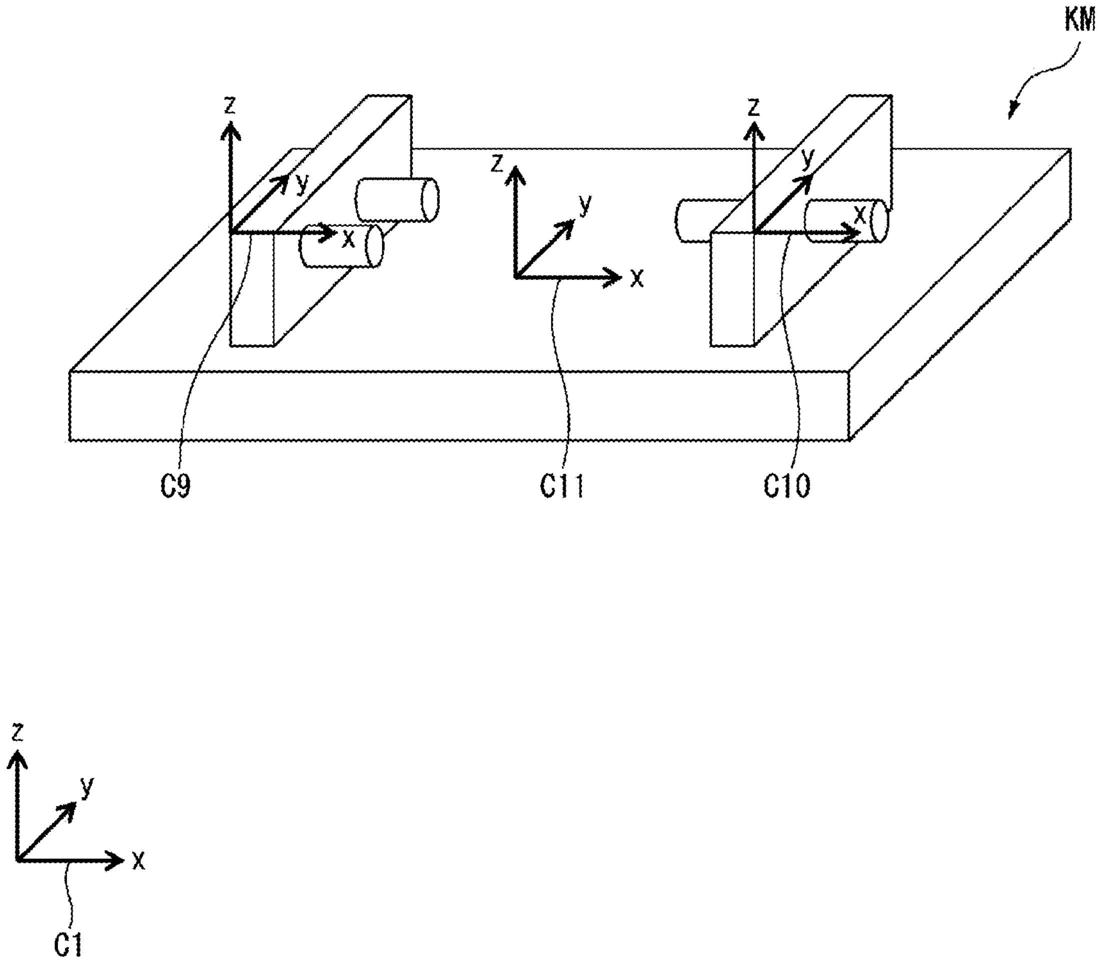
FIG. 34 schematically illustrates workpiece coordinates representing positions of a plurality of portions of the workpiece acquired and a workpiece model defined by the positions.

FIG. 34 schematically illustrates, with respect to the workpiece model KM, the position $P5_R$ (the workpiece coordinate system C9) and the position $P6_R$ (the workpiece coordinate system C10) in the robot coordinate system C1 acquired as the position acquiring unit 48. Here, similarly to the reference workpiece coordinate system C8 described above, a reference workpiece coordinate system C11 is set with respect to the entire workpiece model KM.

Similarly to the device 70 described above, the processor 32 acquires the position $P7_R$ of the reference workpiece coordinate system C11 in the robot coordinate system C1, based on the positions $P5_R$ and $P6_R$ of the robot coordinate system C1 that the processor 32 has acquired functioning as the position acquiring unit 48 and ideal positions (specifically, ideal coordinates) of the workpiece coordinate systems C9 and C10 with respect to the reference workpiece coordinate system C11.

This position $P7_R$ indicates a position (second position) in the robot coordinate system C1 of the workpiece K detected as the shape data SD4 and SD5 by the shape detection sensor 14. Then, similarly to the above-described device 70, the processor 32 determines the target position TP of the end effector 28 in the robot coordinate system C1, based on the acquired position $P7_R$ and the positional relationship RL of the target position TP with respect to the reference workpiece coordinate system C11 taught in advance, and operates the robot 12 in accordance with the target position TP, thereby carrying out a work on the workpiece W through the end effector 28.

As described above, in the present embodiment, the processor 32 functions as the model acquiring unit 44, the partial model generating unit 46, the position acquiring unit 48, the range setting unit 52, the first input reception unit 54, the image data generating unit 56, the second input reception unit 58, the threshold value setting unit 60, and the feature extracting unit 62 to acquire the positions $P5_S$, $P5_R$, $P6_S$, $P6_R$, and $P7_R$ of the workpiece K in the control coordinate system C (the robot coordinate system C1 and the sensor coordinate system C3), based on the shape data SD4 and SD5.

Therefore, the model acquiring unit 44, the partial model generating unit 46, the position acquiring unit 48, the range setting unit 52, the first input reception unit 54, the image data generating unit 56, the second input reception unit 58, the threshold value setting unit 60, and the feature extracting unit 62 constitute a device 80 (FIG. 22) that acquires the position of the workpiece W based on the shape data SD4 and SD5.

In this device 80, the range setting unit 52 sets the limit ranges RR4 and RR5 to be separated from each other (FIG. 24), and the partial model generating unit 46 generates the first partial model KM1 obtained by limiting the workpiece model KM to the first part (the part including the structure model J2) and the second partial model KM2 obtained by limiting the workpiece model KM to the second part (the part including the structure model J3) separated from the first part. According to this configuration, the partial models KM1 and KM2 of parts of the workpiece model KM different from each other can be generated in accordance with various conditions (e.g., the number N of the feature points FPn).

The device 80 includes the feature extracting unit 62 that extracts the feature points FPn of the workpiece model KM used for the model matching MT by the position acquiring unit 48, and the partial model generating unit 46 generates the partial models KM1 and KM2 by limiting the workpiece model KM to the parts J2 and J3 so as to include the feature points FPn extracted by the feature extracting unit 62.

More specifically, according to this configuration in which the workpiece model WM is limited to the parts J2 and J3 so as to include the number N of feature points FPn equal to or greater than the predetermined threshold value $N_{th}$, the partial model generating unit 46 can preferentially generate the partial models KM1 and KM2 for which the model matching MT can be easily executed, and therefore the model matching MT can be executed with high accuracy.

Note that in the present embodiment, as a result of automatically setting the limit ranges RR4 and RR5 based on the number N of the feature points FPn extracted by the feature extracting unit 62, the range setting unit 52 sets the limit ranges RR4 and RR5 to be separated from each other.

However, for example, in a case where the structures J2 and J3 are close to each other in the workpiece model KM, as a result of automatically setting the limit ranges RR4 and RR5 based on the number N of the feature points FPn, the range setting unit 52 sets the limit ranges RR4 and RR5 such that the boundaries thereof coincide with each other or partially overlap each other.

Note that in the devices 70 and 80 described above, a case has been described where the processor 32 determines the target position TP of the end effector 28 based on the positions $P4_R$ and $P7_R$ of the workpieces W and K (i.e., the reference workpiece coordinate systems C8 and C11) in the robot coordinate system C1 acquired by the position acquiring unit 48 and the positional relationship RL taught in advance.

However, in the above-described device 70 or 80, the processor 32 may obtain a correction amount CA from a teaching point TP' taught in advance based on the position $P4_R$ or $P7_R$ acquired by the processor 32 functioning as the position acquiring unit 48. For example, in the device 70 described above, the operator teaches the robot 12 in advance the teaching point TP' at which the end effector 28 is to be positioned when carrying out the work. This teaching point TP' is taught as coordinates of the robot coordinate system C1.

Then, in an actual work line, when acquiring the position $P4_R$ of the workpiece W detected by the shape detection sensor 14, the processor 32 calculates the correction amount CA for shifting the position where the end effector 28 is positioned from the teaching point TP' when carrying out the actual work on the workpiece W based on the position $P4_R$.

When executing the work on the workpiece W, the processor 32 corrects the operation of positioning the end effector 28 to the teaching point TP' in accordance with the calculated correction amount CA, thereby positioning the end effector 28 to a position shifted from the teaching point TP' by the correction amount CA. Note that it should be understood that also the device 80 can similarly execute the calculation of the correction amount CA and the correction of the positioning operation to the teaching point TP'.

Note that in the device 70 or 80 described above, a case has been described where the position acquiring unit 48 acquires the positions $P4_R$ and $P7_R$ of the workpieces W and K (i.e., the reference workpiece coordinate systems C8 and C11) in the robot coordinate system C1, based on the positions P (i.e., the positions $P1_R$, $P2_R$, and $P3_R$ as well as the positions $P5_R$ and $P6_R$) of the plurality of portions of the workpieces W and K in the robot coordinate system C1.

However, the device 70 or 80 can acquire the position $P4_R$ or $P7_R$ of the workpiece W or K in the robot coordinate system C1, based on the position $P1_R$, $P2_R$, $P3_R$, $P5_R$, or $P6_R$ of only one portion of the workpiece W or K. For example, it is assumed that, in the device 80, the structure K2 (or K3) of the workpiece K has a unique structural feature that can uniquely identify the workpiece K, and as a result, a sufficient number N of the feature points FPn exist in the structure model J2 of the workpiece model KM.

In this case, if the position of the structure K2 (structure model J2) can be specified, the position of the entire workpiece K (workpiece model KN) may be uniquely specified. In such a case, the position acquiring unit 48 can obtain the position $P7_R$ (i.e., coordinates of the reference workpiece coordinate system C11 in the robot coordinate system C1) of the workpiece K in the robot coordinate system C1 from only the position $P5_R$ (i.e., coordinates of the workpiece coordinate system C9 in the robot coordinate system C1 in FIG. 34) of the portion of the structure K2 in the robot coordinate system C1 through the above-described method.

Note that in the device 70 or 80 described above, in a case where the range setting unit 52 sets the plurality of limit ranges RR1, RR2, and RR3 or limit ranges RR4 and RR5 with respect to the workpiece model WM or KM, the operator may cancel at least one of them. For example, it is assumed that in the device 70 described above, the processor 32 sets the limit ranges RR1, RR2, and RR3 illustrated in FIG. 9 as the range setting unit 52.

In this case, the operator operates the input device 42 to give the processor 32 the input IP1 for canceling the limit range RR2, for example. The processor 32 receives the input IP1 and cancels the limit range RR2 set in the model coordinate system C5. As a result, the limit range RR2 is deleted, and the processor 32 sets the limit ranges RR1 and RR3 separated from each other in the model coordinate system C5.

Note that in the devices 70 and 80 described above, a case has been described where the range setting unit 52 sets the limit ranges RR1, RR2, and RR3 as well as the limit ranges RR4 and RR5 in a state where the workpiece models WM and KM are arranged in various orientations, and the partial model generating unit 46 generates the partial models WM1, WM2, and WM3 as well as the partial models KM1 and KM2 limited in various orientations.

However, in the device 70 or 80, the range setting unit 52 may set the limit ranges RR1, RR2, and RR3 or the limit ranges RR4 and RR5 to the workpiece models WM or KM in only one orientation, and the partial model generating unit 46 may generate the partial models WM1, WM2, and WM3 or the partial models KM1 and KM2 limited in only one orientation.

In the above-described device 70 or 80, the range setting unit 52 may set any number n of limit regions RRn, and the partial model generating unit 46 may generate any number n of partial models WMn or KMn in accordance with the limit regions RR. The method of setting the above-described limit regions RR is an example, and the range setting unit 52 may set the limit regions RR through any other method.

Note that at least one of the range setting unit 52, the first input reception unit 54, the image data generating unit 56, the second input reception unit 58, and the threshold value setting unit 60 can be omitted from the above-described device 70. For example, the range setting unit 52 can be omitted from the device 70 described above, and the processor 32 can automatically limit the workpiece model WM to the partial models WM1, WM2, and WM3 based on the detection positions DP1, DP2, and DP3 of the shape detection sensor 14.

Specifically, it is assumed that a reference position RP at which the workpiece W is arranged in the work line is predetermined as coordinates of the robot coordinate system C1. In this case, the processor 32 executes a simulation of simulatively imaging the workpiece model WM through a shape detection sensor model 14M modeling the shape detection sensor 14 every time the workpiece model WM is arranged at the reference position RP and the shape detection sensor model 14M is arranged at each of the detection positions DP1, DP2, and DP3 in the virtual space defined by the robot coordinate system C1.

Here, since the positional relationship between the robot coordinate system C1 and the sensor coordinate system C3 is known, shape data SD1', SD2', and SD3' obtained by simulatively imaging the workpiece model WM by the shape detection sensor model 14M positioned at each of the detection positions DP1, DP2, and DP3 in this simulation can be estimated.

The processor 32 estimates the shape data SD1', SD2', and SD3' based on the coordinates of the reference position RP in the robot coordinate system C1, the model data of the workpiece model WM arranged at the reference position RP, and the coordinates of the detection positions DP1, DP2, and DP3 (i.e., the sensor coordinate system C3). Then, the processor 32 automatically generates the partial models WM1, WM2, and WM3 based on the parts RM1, RM2, and RM3 of the workpiece model WM included in the estimated shape data SD1', SD2', and SD3'.

Alternatively, the partial model generating unit 46 may limit the workpiece model WM to a plurality of partial models by dividing the workpiece model WM at predetermined (or randomly determined) intervals. In this way, the processor 32 can automatically limit the workpiece model WM to the partial models WM1, WM2, and WM3 without setting the limit range RR.

Note that it should be understood that the processor 32 can automatically limit also the workpiece model KM to the partial models KM1 and KM2 without setting the limit range RR through a similar method. The method of limiting the workpiece model WM or KM described above to the partial model is an example, and the partial model generating unit 46 may limit the workpiece model WM or KM to the partial model through any other method.

The image data generating unit 56 and the second input reception unit 58 may be omitted from the device 70, and the position acquiring unit 48 may execute the model matching MT between the partial models WM1, WM2, and WM3 and the shape data SD1, SD2, and SD3 without receiving the input IP2 of permission from the operator. Alternatively, the threshold value setting unit 60 may be omitted from the device 70, and the threshold values $\mu 1_{th}$, $\mu 2_{th}$, and $\mu 3_{th}$ for the model matching MT may be determined in advance as values common to the partial models WM1, WM2, and WM3.

At least one of the range setting unit 52, the first input reception unit 54, the image data generating unit 56, the second input reception unit 58, the threshold value setting unit 60, and the feature extracting unit 62 can be omitted from the above-described device 80. For example, the range setting unit 52 and the feature extracting unit 62 may be omitted from the device 80, and the partial model generating unit 46 may limit the workpiece model KM to a plurality of partial models by dividing the workpiece model KM at predetermined (or randomly determined) intervals.

Note that in the embodiments described above, a case has been described where the shape detection sensor 14 is a three-dimensional vision sensor, but the present disclosure is not limited hereto, and the shape detection sensor 14 may be a two-dimensional camera that images the workpieces W and K. In this case, the robot system 10 may further include a distance measuring sensor capable of measuring the distance d from the shape detection sensor 14 to the workpiece W or K.

The shape detection sensor 14 is not limited to a vision sensor (or a camera), and may be any sensor capable of detecting the shape of the workpiece W or K, such as a three-dimensional laser scanner that detects the shape of the workpiece W or K by receiving reflected light of emitted laser light, or a contact type shape detection sensor including a probe that detects contact with the workpiece W or K.

The shape detection sensor 14 is not limited to a form to be fixed to the end effector 28, and may be fixed at a known position (e.g., a jig or the like) in the robot coordinate system C1. Alternatively, the shape detection sensor 14 may include a first shape detection sensor 14A fixed to the end effector 28 and a second shape detection sensor 14B fixed at a known position in the robot coordinate system C1. The workpiece model WM may be two-dimensional data (e.g., two-dimensional CAD data).

Note that each unit (the model acquiring unit 44, the partial model generating unit 46, the position acquiring unit 48, the range setting unit 52, the first input reception unit 54, the image data generating unit 56, the second input reception unit 58, the threshold value setting unit 60, and the feature extracting unit 62) of the above-described device 70 or 80 is a functional module implemented by a computer program executed by the processor 32, for example.

In the embodiments described above, a case has been described where the devices 50, 70, and 80 are mounted in the controller 16. However, the present disclosure is not limited hereto, and at least one of the functions (the model acquiring unit 44, the partial model generating unit 46, the position acquiring unit 48, the range setting unit 52, the first input reception unit 54, the image data generating unit 56, the second input reception unit 58, the threshold value setting unit 60, and the feature extracting unit 62) of the device 50, 70, or 80 may be implemented in a computer different from the controller 16.

Figure 35:
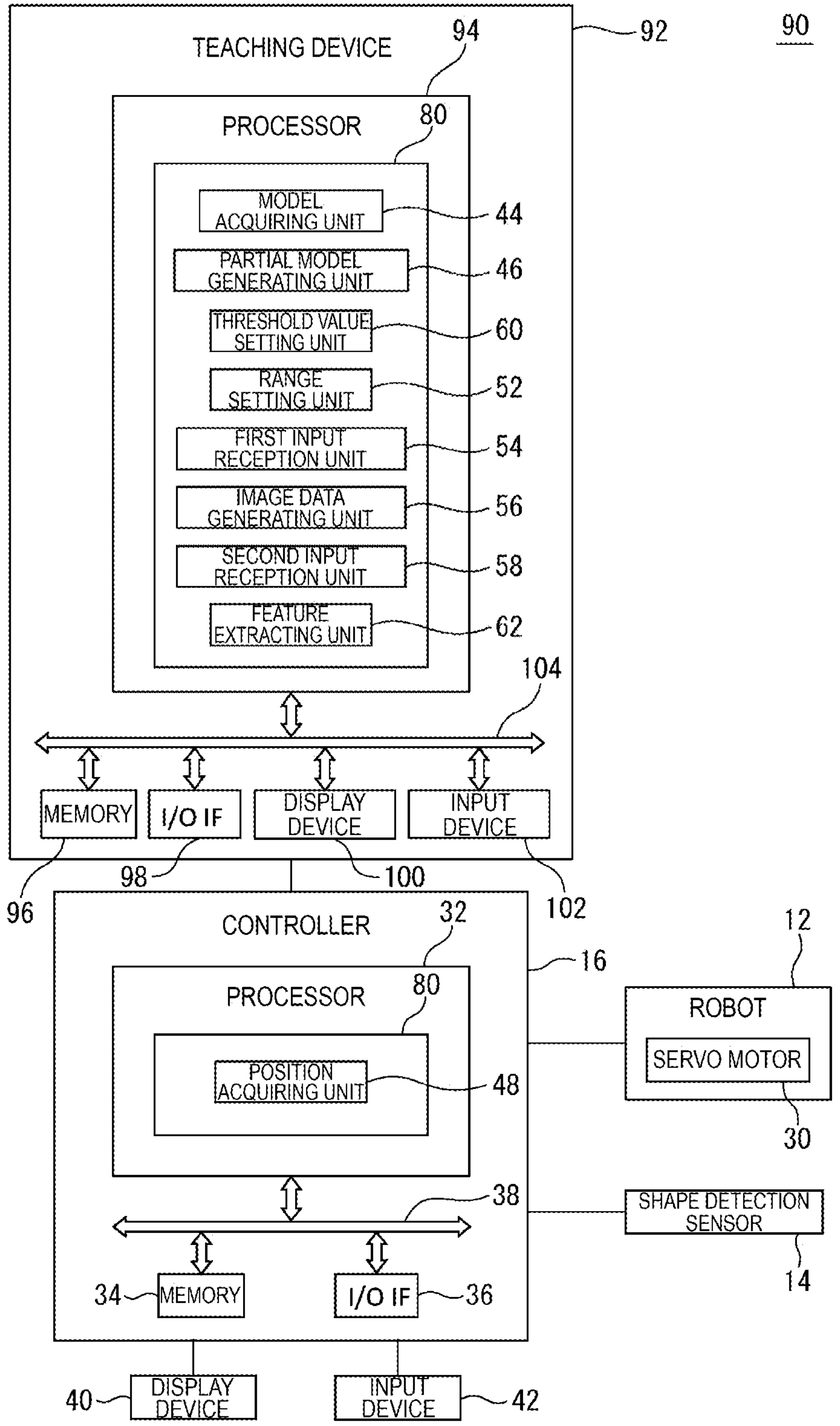
FIG. 35 is a schematic view of a robot system according to another embodiment.

Such a form is illustrated in FIG. 35. A robot system 90 illustrated in FIG. 35 includes the robot 12, the shape detection sensor 14, the controller 16, and a teaching device 92. The teaching device 92 teaches the robot 12 an operation for carrying out a work (work handling, welding, laser process, and the like) on the workpiece W.

Specifically, the teaching device 92 is, for example, a portable computer such as a teaching pendant or a tablet terminal device, and includes a processor 94, a memory 96, an I/O interface 98, a display device 100, and an input device 102. Note that the configurations of the processor 94, the memory 96, the I/O interface 98, the display device 100, and the input device 102 are similar to those of the processor 32, the memory 34, the I/O interface 36, the display device 40, and the input device 42 described above, and thus overlapping description will be omitted.

The processor 94 includes a CPU or a GPU, is communicably connected to the memory 96, the I/O interface 98, the display device 100, and the input device 102 via a bus 104, and performs arithmetic processing for implementing a teaching function while communicating with these components. The I/O interface 98 is communicably connected to the I/O interface 36 of the controller 16. Note that the display device 100 and the input device 102 may be integrally incorporated in a housing of the teaching device 92, or may be externally attached to the housing as bodies separate from the housing of the teaching device 92.

The processor 94 is configured to be capable of sending a command to the servo motor 30 of the robot 12 via the controller 16 in accordance with input data to the input device 102, and causing the robot 12 to perform a jogging operation in accordance with the command. The operator operates the input device 102 to teach the robot 12 an operation for a predetermined work, and the processor 94 generates an operation program OP for work based on teaching data (e.g., the teaching point TP', an operation speed V, and the like of the robot 12) obtained as a result of the teaching.

In the present embodiment, the model acquiring unit 44, the partial model generating unit 46, the range setting unit 52, the first input reception unit 54, the image data generating unit 56, the second input reception unit 58, the threshold value setting unit 60, and the feature extracting unit 62 of the device 80 are mounted on the teaching device 92. On the other hand, the position acquiring unit 48 of the device 80 is mounted on the controller 16.

In this case, the processor 94 of the teaching device 92 functions as the model acquiring unit 44, the partial model generating unit 46, the range setting unit 52, the first input reception unit 54, the image data generating unit 56, the second input reception unit 58, the threshold value setting unit 60, and the feature extracting unit 62, and the processor 32 of the controller 16 functions as the position acquiring unit 48.

For example, the processor 94 of the teaching device 92 may function as the model acquiring unit 44, the partial model generating unit 46, the range setting unit 52, the first input reception unit 54, the image data generating unit 56, the second input reception unit 58, the threshold value setting unit 60, and the feature extracting unit 62, generate the partial models KM1 and KM2, and create the operation program OP that causes the processor 32 (i.e., the position acquiring unit 48) of the controller 16 to execute an operation (e.g., operation of the model matching MT) of acquiring the first positions $P5_S$, $P5_R$, $P5_S$, and $P6_R$ of the portions K2 and K3 of the workpiece K in the control coordinate system C, based on the model data of the partial models KM1 and KM2.

Although the present disclosure has been described through embodiments above, the embodiments described above do not limit the scope of the invention claimed in the claims.

REFERENCE SIGNS LIST

10, 90 Robot system
12 Robot
14 Shape detection sensor
16 Controller
32, 94 Processor
44 Model acquiring unit
46 Partial model generating unit
48 Position acquiring unit
50, 70, 80 Device
52 Range setting unit
54, 58 Input reception unit
56 Image data generating unit
60 Threshold value setting unit
62 Feature extracting unit
92 Teaching device

The invention claimed is:

1. A device configured to acquire a position of a workpiece in a control coordinate system based on shape data of the workpiece detected by a shape detection sensor arranged at a known position in the control coordinate system, the device comprising a processor configured to:

acquire a workpiece model modeling the workpiece;

generate partial models obtained by limiting the workpiece model to a part thereof, using the acquired workpiece model, wherein the processor respectively generates the partial models in a plurality of orientations when viewing the part of the workpiece model from a plurality of virtual visual-line directions; and acquire a first position in the control coordinate system of a portion of the workpiece corresponding to the partial model, by respectively matching the generated partial models with the shape data detected by the shape detection sensor.

2. The device of claim 1, wherein the processor is configured to generate a plurality of the partial models obtained by limiting the workpiece model to a plurality of the parts respectively.

3. The device of claim 2, wherein the processor is configured to generate:

a first partial model obtained by limiting the workpiece model to a first part; and a second partial model obtained by limiting the workpiece model to a second part separated from the first part.

4. The device of claim 2, wherein the processor is configured to generate the plurality of partial models obtained by limiting the workpiece model to the plurality of parts by dividing an entirety of the workpiece model into the plurality of parts.

5. The device of claim 2, wherein the processor is configured to:

obtain a coincidence degree between the partial models and the shape data;

determine whether or not the partial models match the shape data by comparing the obtained coincidence degree with a predetermined threshold value; and individually set the threshold value for each of the plurality of partial models.

6. The device of claim 1, wherein the processor is configured to; set a limit range for limiting to the part, with respect to the workpiece model; and generate the partial models by limiting the workpiece model to the part in accordance with the set limit range.

7. The device of claim 6, wherein the processor is configured to set the limit range based on a detection range in which the shape detection sensor detects the workpiece.

8. The device of claim 6, wherein the processor is configured to; receive an input for defining the limit range; and set the limit range in accordance with the received input.

9. The device of claim 8, wherein the processor is configured to:

generate image data of the partial models; and receive, through the generated image data, the input for changing or canceling the set limit range, or the input for additionally setting a new limit range.

10. The device of claim 6, wherein the processor is configured to:

set a first limit range for limiting to a first part and a second limit range for limiting to a second part, with respect to the workpiece model;

generate a first partial model by limiting the workpiece model to the first part in accordance with the set first limit range; and generate a second partial model by limiting the workpiece model to the second part in accordance with the set second limit range.

11. The device of claim 10, wherein the processor is configured to:

set the first limit range and the second limit range such that boundaries thereof coincide with each other;

set the first limit range and the second limit range so as to be separated from each other; or set the first limit range and the second limit range so as to partially overlap each other.

12. The device of claim 1, wherein the processor is configured to:

extract a feature point of the workpiece model used for the matching; and generate the partial models by limiting the workpiece model to the part so as to include the extracted feature point.

13. The device of claim 12, wherein the processor is configured to limit the workpiece model to the part so as to include a plurality of the feature points, the number of which is equal to or greater than a predetermined threshold value.

14. A device configured to acquire a position of a workpiece in a control system based on shape data of the workpiece detected by a shape detection sensor arranged at a known position in the control coordinate system, the device comprising a processor configured to:

acquire a workpiece model modeling the workpiece;

generate a partial model obtained by limiting the workpiece model to a part thereof, using the acquired workpiece model;

acquire a first position in the control coordinate system of a portion of the workpiece corresponding to the partial model, by matching the generated partial model with the shape data detected by the shape detection sensor; and acquire a second position of the workpiece in the control coordinate system, based on the first position and a position of the partial model in the workpiece model.

15. The device of claim 14, wherein the processor is configured to generate a plurality of the partial models obtained by limiting the workpiece model to a plurality of the parts respectively; and acquire a plurality of the first positions in the control coordinate system of a plurality of the portions respectively corresponding to the plurality of partial models, by matching the plurality of partial models with the shape data; and acquire the second position based on each of the acquired first positions.

16. The device of claim 1 wherein the processor is configured to:

generate image data of the partial model; and receive, through the generated image data, an input for permitting the processor to use the partial model for the matching.

17. A controller of a robot, comprising the device of claim 1.

18. A robot system, comprising:

a shape detection sensor arranged at a known position in a control coordinate system, and configured to detect a shape of a workpiece;

a robot configured to carry out a predetermined work on the workpiece; and the controller of claim 17, wherein the controller is configured to control the robot so as to carry out the predetermined work based on the first position acquired by the processor.

19. A method of acquiring a position of a workpiece in a control coordinate system based on shape data of the workpiece detected by a shape detection sensor arranged at a known position in the control coordinate system, the method comprising:

acquiring, by a processor, a workpiece model modeling the workpiece;

generating, by the processor, a partial model obtained by limiting the workpiece model to a part thereof, using the acquired workpiece model, and respectively generating partial models in a plurality of orientations when viewing the part of the workpiece model from a plurality of virtual visual-line directions; and acquiring, by the processor, a position in the control coordinate system of a portion of the workpiece corresponding to the partial model, by respectively matching the generated partial models with the shape data detected by the shape detection sensor.

* * * * *